United States Patent
Al-Saadi et al.

(10) Patent No.: US 12,313,553 B2
(45) Date of Patent: May 27, 2025

(54) MATERIALS AND METHODS FOR SURFACE-ENHANCED RAMAN SCATTERING (SERS) BASED DETECTION OF DIBENZOTHIOPHENE IN FUEL OILS

(71) Applicant: KING FAHD UNIVERSITY OF PETROLEUM AND MINERALS, Dhahran (SA)

(72) Inventors: Abdulaziz Abdulrahman Al-Saadi, Dhahran (SA); Sathiyamoorthy Murugesan, Dhahran (SA); Muhammad Haroon, Dhahran (SA); Tawfik A. Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 376 days.

(21) Appl. No.: 18/158,140

(22) Filed: Jan. 23, 2023

(65) Prior Publication Data
US 2024/0255430 A1    Aug. 1, 2024

(51) Int. Cl.
*G01N 21/65*    (2006.01)
*B22F 1/054*    (2022.01)
*B22F 1/18*    (2022.01)

(52) U.S. Cl.
CPC ........... *G01N 21/658* (2013.01); *B22F 1/056* (2022.01); *B22F 1/18* (2022.01); *B22F 2301/255* (2013.01);
(Continued)

(58) Field of Classification Search
CPC ........ G01N 21/658; G01N 2201/06113; B22F 1/056; B22F 1/18; B22F 2301/255; B22F 2304/056; B22F 2304/058
See application file for complete search history.

(56) References Cited

U.S. PATENT DOCUMENTS 10,927,006 B2    2/2021    Ventura et al.

FOREIGN PATENT DOCUMENTS

| | | |
|---|---|---|
| CN | 109520995 B | 12/2020 |
| CN | 110296973 B | 11/2021 |
| CN | 113624742 B | 5/2022 |

OTHER PUBLICATIONS

Sathiyamoorthy Murugesan, Muhammad Haroon, Tawfik A. Saleh, Abdulaziz A. Al Saadi,Silver-loaded silica/H-ZSM-5 nanocomposite as a sensitive SERS substrate for the detection of sulfur-containing compounds in diesel fuel,Fuel 333 (2023) 126298 (Year: 2022).*

(Continued)

*Primary Examiner* — Bijan Ahvazi
(74) *Attorney, Agent, or Firm* — Oblon, McClelland, Maier & Neustadt, L.L.P.

(57) ABSTRACT

A surface-enhanced Raman scattering (SERS) substrate is provided. The SERS substrate includes a transparent substrate and a nanocomposite composition. The nanocomposite composition includes a silver-loaded silica ($Ag-SiO_2$) nanocomposite having a silica core and a silver/silica shell disposed around the silica core and a zeolitic material having a nano porous structure. The silver/silica shell contains silver nanoparticles uniformly distributed therein. The $Ag-SiO_2$ nanocomposite is uniformly disposed on a surface of the zeolitic material. The nanoparticles of the $Ag-SiO_2$ nanocomposite are spherical and have a mean particle size of 100 to 500 nanometers (nm). A method of obtaining a Raman spectrum of a sulfur-containing compound in a mixing composition is also provided.

18 Claims, 17 Drawing Sheets

(52) U.S. Cl.
 CPC ... *B22F 2304/056* (2013.01); *B22F 2304/058* (2013.01); *G01N 2201/06113* (2013.01)

(56) References Cited

OTHER PUBLICATIONS

Xiaoqian Feng, Hongmo Li, Qing Zhang, Peng Zhang, Xuefeng Song, Jing Liu, Liping Zhao and Lian Gao, SiO2—Ag—SiO2 core/shell structure with a high density of Ag nanoparticles for CO oxidation catalysis, Nanotechnology 27 (2016) 455605 (7pp) (Year: 2016).*

Kwok Wei Shah, et al., "Aqueous route to facile, efficient and functional silica coating of metal nanoparticles at room temperature", Nanoscale, vol. 6, Issue 19, Jul. 25, 2014, pp. 11273-11281 (Abstract only).

Qian Chen, et al., "A low-cost 3D core-shell nanocomposite as ultrasensitive and stable surface enhanced Raman Spectroscopy substrate", Sensors and Actuators B: Chemical, vol. 327, Article No. 128907, Jan. 15, 2021, 2 pages (Abstract only).

Tianlin Ye, et al., "Surface-enhanced Raman scattering detection of dibenzothiophene and its derivatives without πacceptor compound using multilayer Ag NPs modified glass fiber paper", Talanta, vol. 220, Article No. 121357, Dec. 1, 2020, 4 pages (Abstract only).

O. Guselnikova, et al., "Plasmon-assisted self-cleaning sensor for the detection of organosulfur compounds in fuels", Journal of Materials Chemistry C, vol. 7, Issue 45, Oct. 15, 2019, pp. 14181-14187 (Abstract only).

Muhammad Haroon, et al., "NMR evidence for hydrogen bonding stabilized anti conformation of 1-methoxy-1-methyl-3-phenylurea and the concentration detection by SERS", Journal of Molecular Liquids, vol. 357, Article No. 119096, Jul. 1, 2022, 3 pages (Abstract only).

E. H. Ellison, et al., "Enhanced Quenching of Anthracene Fluorescence by Nitroalkanes in Zeolite X and Y", Langmuir, vol. 17, No. 8, Feb. 15, 2001, pp. 2446-2454.

Olga E. Eremina, et al., "Silver-chitosan nanocomposite as a plasmonic platform for SERS sensing of polyaromatic sulfur heterocycles in oil fuel", Nanotechnology, IOP Publishing Ltd, vol. 31, No. 22, Article No. 225503, Mar. 13, 2020, 15 pages.

Peter White, et al., "Surface-enhanced Raman scattering (SERS) spectroscopy identifies fraudulent uses of fuels", SpectroscopyEurope, vol. 25, No. 2, 2013, pp. 18-22.

Yu Liu, et al., "Modeling of compressed liquid viscosity of hydrofluorocarbons, hydrofluoroolefins, hydrochlorofluoroolefins, hydrochlorofluorocarbons and their mixtures", Journal of Molecular Liquids, vol. 357, No. 5, Article No. 119093, Apr. 2022, pp. 1-9.

* cited by examiner

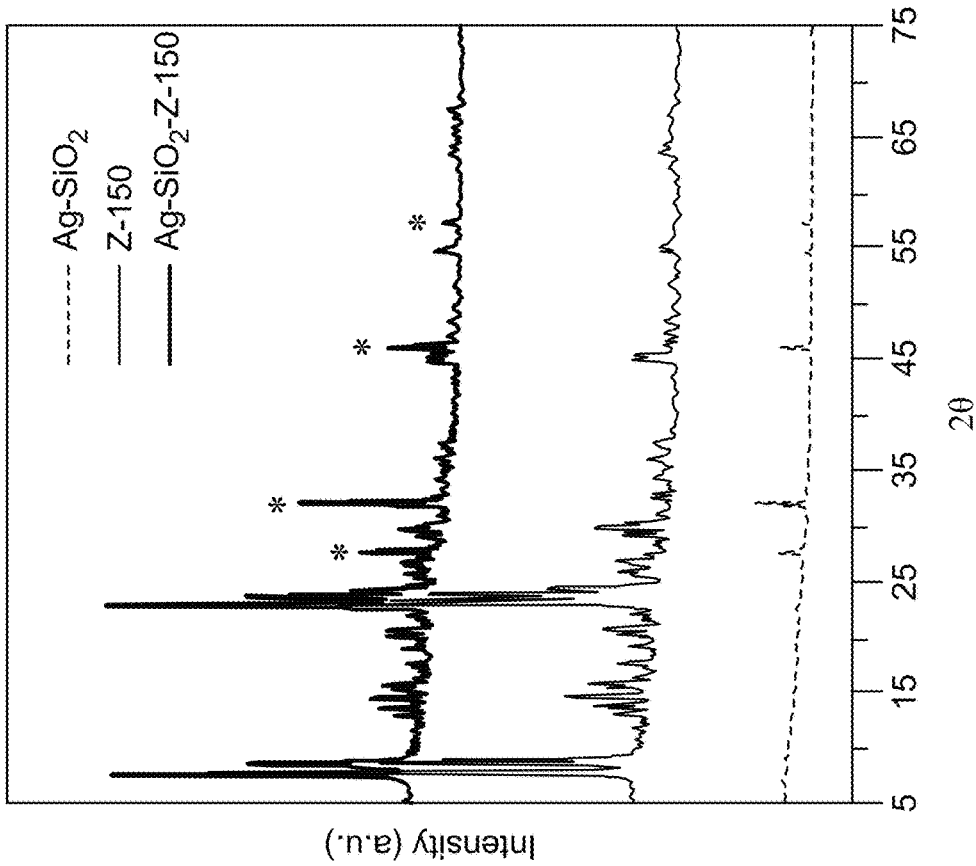
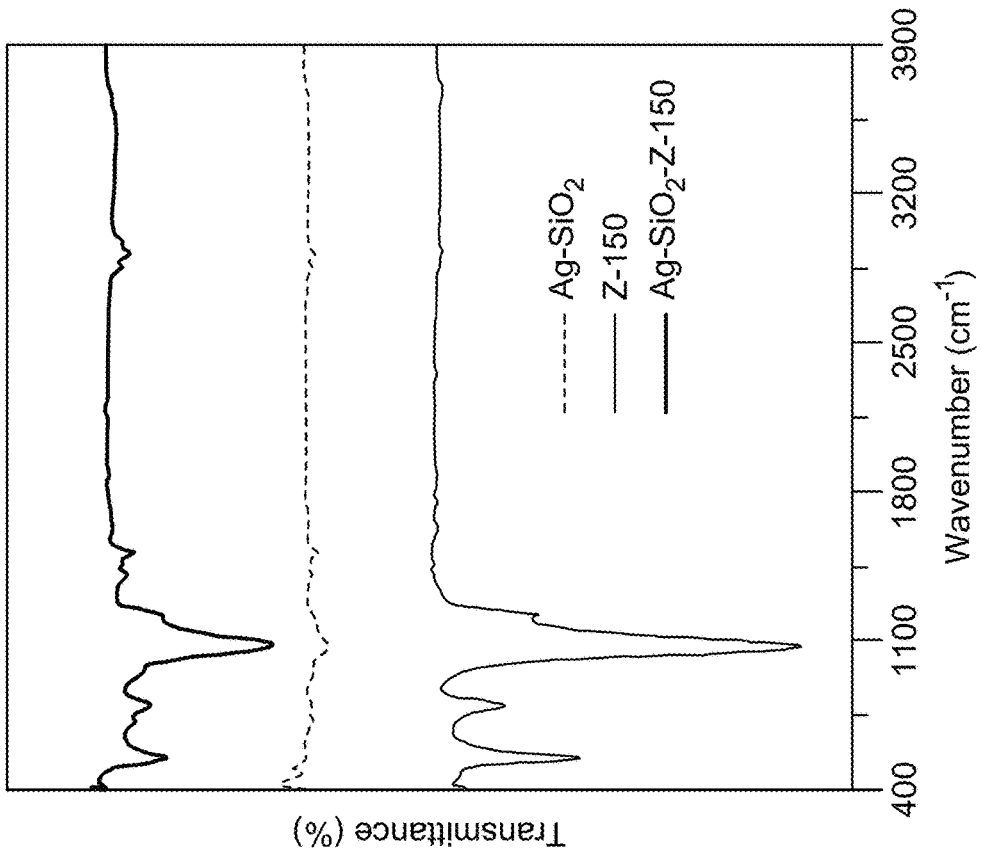
FIG. 4B
FIG. 4A

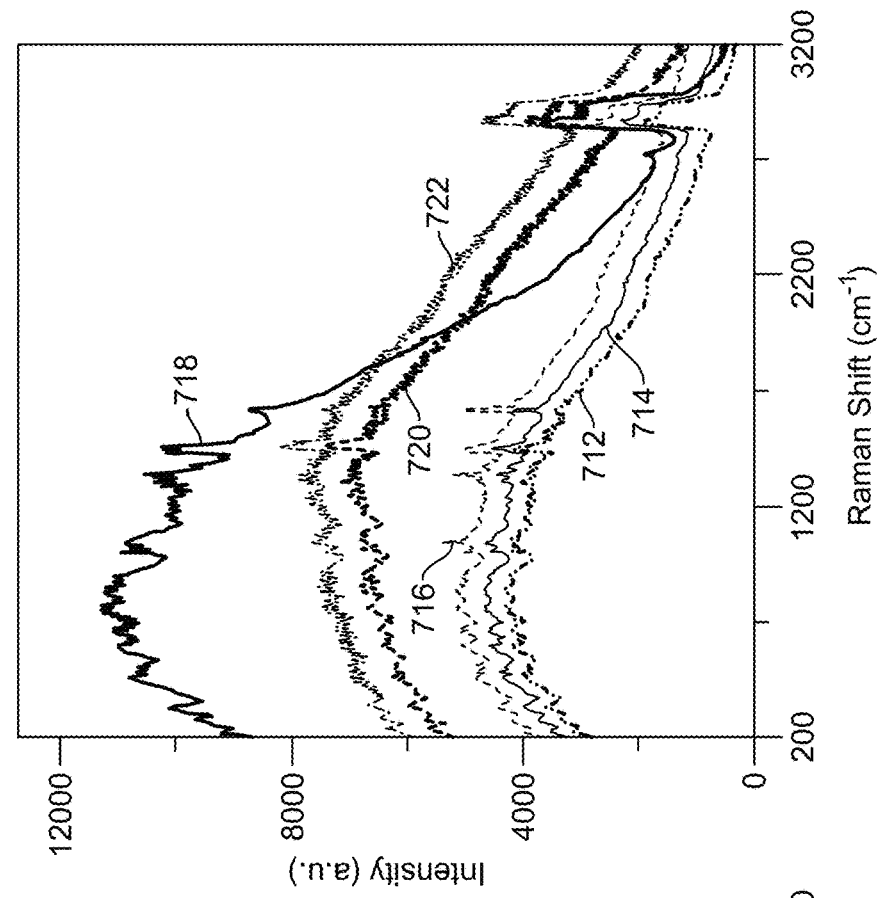
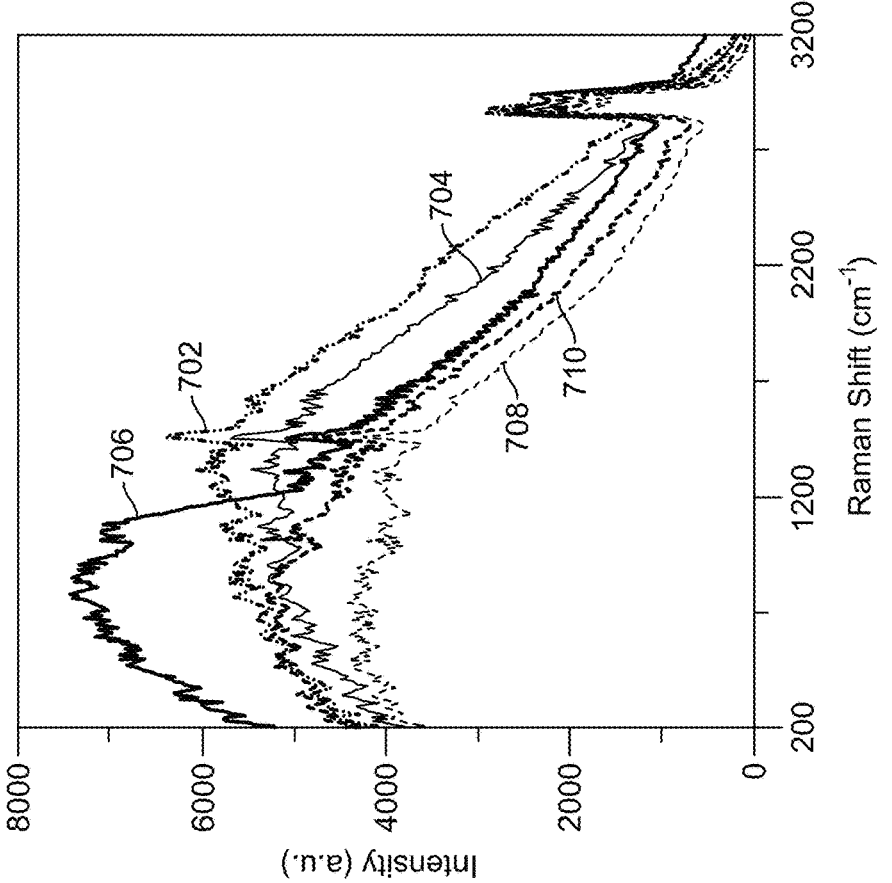

MATERIALS AND METHODS FOR SURFACE-ENHANCED RAMAN SCATTERING (SERS) BASED DETECTION OF DIBENZOTHIOPHENE IN FUEL OILS

STATEMENT REGARDING PRIOR DISCLOSURE BY THE INVENTORS

Aspects of this technology are described in an article "Silver-loaded silica/H-ZSM-5 nanocomposite as a sensitive SERS substrate for the detection of sulfur-containing compounds in diesel fuel" published in Fuel, Volume 333, 17 Oct. 2022, 126298, which is incorporated herein by reference in its entirety.

STATEMENT OF ACKNOWLEDGEMENT

This research was supported by King Fahd University of Petroleum and Minerals under the project number INRC2114.

BACKGROUND

Technical Field

The present disclosure is directed to a surface-enhanced Raman scattering (SERS) substrate, and particularly to, a silver-loaded silica/H-ZSM-5 nanocomposite containing SERS substrate for sensing applications, and a method of making the SERS substrate.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Petroleum demand continues to increase rapidly because of the dynamic development in the world economy. As a result, more concerns are arising regarding the quality of petroleum products and their corresponding impact on human health. Because of the different chemical compositions of oil and petrochemical supplies [R. M. Alberici, R. C. Simas, V. de Souza, G. F. de Sá, R. J. Daroda, M. N. Eberlin, Analysis of fuels via easy ambient sonic-spray ionization mass spectrometry, Analytica Chimica Acta. 659 (2010) 15-22], sensitive and rapid detection tools that reliably monitor undesired contaminants are always challenging due to the variation in petroleum contents, which fluctuate based on climatic conditions and source of origin [S. Li, L. K. Dai, Classification of gasoline brand and origin by Raman spectroscopy and a novel R-weighted LSSVM algorithm, Fuel. 96 (2012) 146-152].

There is a huge space for innovation in an oil product quality control ecosystem [J. Lee, S. Balakrishnan, J. Cho, S. H. Jeon, J. M. Kim, Detection of adulterated gasoline using colorimetric organic microfibers, Journal of Materials Chemistry. 21 (2011) 2648-2655] based on ingeniously and creatively measuring physical attributes of chemical contents [L. L. Barbosa, F. V. C. Kock, R. C. Silva, J. C. C. Freitas, V. Lacerda, E. V. R. Castro, Application of low-field NMR for the determination of physical properties of petroleum fractions, Energy and Fuels. 27 (2013) 673-679]. Crude oil refinery products, in particular gasoline and diesel, undesirably contain trace amounts of sulfur-containing compounds [M. N. Hossain, H. C. Park, H. S. Choi, A Comprehensive Review on Catalytic Oxidative Desulfurization of Liquid Fuel Oil, Catalysts 2019, Vol. 9, Page 229. 9 (2019) 229], such as dibenzothiophene, benzothiophene, 2-methylbenzothiophene, 2,4-dimethylthiophene, 3-methylthiophene, 2-methylthiophene, thiophene, and several others.

Refining fossil fuels into useable energy sources leads, in most cases, to sulfur and sulfur oxides as byproducts. This helps prevent sulfur compounds from being discharged into the atmosphere when fuel is burned. Furthermore, the sulfur content of petrochemical products represents a widespread concern, owing to the strict monitoring practices enforced by government agencies [R. E. Pauls, Determination of High-Octane Components: Methyl t-Butyl Ether, Benzene, Toluene, and Ethanol in Gasoline by Liquid Chromatography, Journal of Chromatographic Science. 23 (1985) 437-441].

To face such challenges, various analytical and spectroscopic tools have identified the levels of organic constituents and small gas molecules in refinery and oil products [J. Blomberg, T. Riemersma, M. Van Zuijlen, H. Chaabani, Comprehensive two-dimensional gas chromatography coupled with fast sulfur-chemiluminescence detection: implications of detector electronics, Journal of Chromatography A. 1050 (2004) 77-84; A. Lambrecht, K. Schmitt, Mid-infrared gas-sensing systems and applications, Mid-Infrared Optoelectronics: Materials, Devices, and Applications. (2020) 661-715; R. Perez Pineiro, C. A. Peeples, J. Hendry, J. Hoshowski, G. Hanna, A. Jenkins, Raman and DFT Study of the H2S Scavenger Reaction of HET-TRZ under Simulated Contactor Tower Conditions, Industrial and Engineering Chemistry Research. 60 (2021) 5394-5402], such as nuclear magnetic resonance (NMR), chemiluminescence, choralography, gas chromatography-mass spectrometry (GC-MS), and vibrational spectroscopy.

Raman spectroscopy is considered to be a facile technique for identifying adulteration in the oil industry [Y. Wei, et al., Soy intake and breast cancer risk: a prospective study of 300,000 Chinese women and a dose-response meta-analysis, European Journal of Epidemiology. 35 (2020) 567-578; and X. Zhang, X. Qi, M. Zou, F. Liu, Rapid Authentication of Olive Oil by Raman Spectroscopy Using Principal Component Analysis, 44 (2011) 2209-2220]. On the other hand, surface-enhanced Raman scattering (SERS) spectroscopy is a viable alternatives for the quick quantification of chemical compositions in several industrial sectors [J. Wang, C. Qiu, H. Pang, J. Wu, M. Sun, D. Liu, High-performance SERS substrate based on perovskite quantum dot-graphene/nano-Au composites for ultrasensitive detection of rhodamine 6G and p-nitrophenol, Journal of Materials Chemistry C. 9 (2021) 9011-9020; V. Heleg-Shabtai, A. Zaltsman, M. Sharon, H. Sharabi, I. Nir, D. Marder, G. Cohen, I. Ron, A. Pevzner, Explosive vapour/particles detection using SERS substrates and a hand-held Raman detector, RSC Advances. 11 (2021) 26029-26036; S. Adhikari, E. K. Ampadu, M. Kim, D. Noh, E. Oh, D. Lee, Detection of Explosives by SERS Platform Using Metal Nanogap Substrates, Sensors 2021, Vol. 21, Page 5567. 21 (2021) 5567; Y. Zhao, L. Du, H. Li, W. Xie, J. Chen, Is the Suzuki-Miyaura Cross-Coupling Reaction in the Presence of Pd Nanoparticles Heterogeneously or Homogeneously Catalyzed? An Interfacial Surface-Enhanced Raman Spectroscopy Study, Journal of Physical Chemistry Letters. 10 (2019) 1286-1291; M. Haroon, M. Tahir, H. Nawaz, M. I. Majeed, A. A. Al-Saadi, Surface-enhanced Raman scattering (SERS) spectroscopy for prostate cancer diagnosis: A review, Photodiagnosis and Photodynamic Therapy. 37 (2022) 102690], has been used less frequently in petrochemistry [K. M. Tan, I. Barman, N.C. Dingari, G. P. Singh, T. F. Chia, W. L. Tok, Toward the development of Raman spectroscopy as a nonperturbative online monitoring tool for gasoline adulteration, Analytical Chemistry. 85 (2013) 1846-1851].

The difficulties associated with detecting and measuring sulfur content could be due two main reasons: the complex nature of oil samples, and the fluorescence phenomenon normally associated with these samples. Nonetheless, SERS has been established to provide precise fingerprint information, low detection limits, and good selectivity when used as a spectro-analytical characterization tool [X. Zhang, X. Qi, M. Zou, J. Wu, Rapid detection of gasoline by a portable Raman spectrometer and chemometrics, Journal of Raman Spectroscopy. 43 (2012) 1487-1491; M. Haroon, I. Abdulazeez, T. A. Saleh, A. A. Al-Saadi, electrochemically modulated SERS detection of procaine using FTO electrodes modified with silver-decorated carbon nanosphere, Electrochimica Acta. 387 (2021) 138463].

SERS peak intensities are sensitive to engineered nanomaterials due to chemical and electromagnetic interactions. By employing a transition metal-doped nanostructured surface, known as a SERS substrate, the sensitivity of Raman scattering can be improved [J. Wang, C. Qiu, H. Pang, J. Wu, M. Sun, D. Liu, High-performance SERS substrate based on perovskite quantum dot-graphene/nano-Au composites for ultrasensitive detection of rhodamine 6G and p-nitrophenol, Journal of Materials Chemistry C. 9 (2021) 9011-9020; V. Heleg-Shabtai, A. Zaltsman, M. Sharon, H. Sharabi, I. Nir, D. Marder, G. Cohen, I. Ron, A. Pevzner, Explosive vapour/particles detection using SERS substrates and a hand-held Raman detector, RSC Advances. 11 (2021) 26029-26036; S. Adhikari, E. K. Ampadu, M. Kim, D. Noh, E. Oh, D. Lee, Detection of Explosives by SERS Platform Using Metal Nanogap Substrates, Sensors 2021, Vol. 21, Page 5567. 21 (2021) 5567; Y. Zhao, L. Du, H. Li, W. Xie, J. Chen, Is the Suzuki-Miyaura Cross-Coupling Reaction in the Presence of Pd Nanoparticles Heterogeneously or Homogeneously Catalyzed? An Interfacial Surface-Enhanced Raman Spectroscopy Study, Journal of Physical Chemistry Letters. 10 (2019) 1286-1291; M. Haroon, M. Tahir, H. Nawaz, M. I. Majeed, A. A. Al-Saadi, Surface-enhanced Raman scattering (SERS) spectroscopy for prostate cancer diagnosis: A review, Photo diagnosis and Photodynamic Therapy. 37 (2022) 102690; K. M. Tan, I. Barman, N.C. Dingari, G. P. Singh, T. F. Chia, W. L. Tok, Toward the development of Raman spectroscopy as a nonperturbative online monitoring tool for gasoline adulteration, Analytical Chemistry. 85 (2013) 1846-1851; X. Zhang, X. Qi, M. Zou, J. Wu, Rapid detection of gasoline by a portable Raman spectrometer and chemometrics, Journal of Raman Spectroscopy. 43 (2012) 1487-1491; M. Haroon, I. Abdulazeez, T. A. Saleh, A. A. Al-Saadi, Electrochemically modulated SERS detection of procaine using FTO electrodes modified with silver-decorated carbon nanosphere, Electrochimica Acta. 387 (2021) 138463; A. A. Al-Saadi, M. Haroon, S. A. Popoola, T. A. Saleh, Sensitive SERS detection and characterization of procaine in aqueous media by reduced gold nanoparticles, Sensors and Actuators, B: Chemical. 304 (2020) 127057].

The interference caused by the fluorescence background can disrupt trace detections in various circumstances [F. Yu, H. Huang, J. Shi, A. Liang, Z. Jiang, A new gold nanoflower sol SERS method for trace iodine ion based on catalytic amplification, Spectrochimica Acta Part A: Molecular and Biomolecular Spectroscopy. 255 (2021) 119738; S. Ye, X. Li, M. Wang, B. Tang, Fluorescence and SERS Imaging for the Simultaneous Absolute Quantification of Multiple miRNAs in Living Cells, Analytical Chemistry. 89 (2017) 5124-5130].

To address this issue, researchers have introduced two-dimensional nanoscale materials, such as layered metal oxides and metal chalcogenides towards SERS [M. Haroon, M. Ashraf, N. Ullah, M. Nawaz Tahir, A. A. Al-Saadi, SERS and EC-SERS detection of local anesthetic procaine using Pd loaded highly reduced graphene oxide nanocomposite substrate, Spectrochimica Acta Part A: Molecular and Biomolecular Spectroscopy. 278 (2022) 121381].

Some forms of bare and functionalized zeolitic frameworks were potentially used to control the fluorescence contribution either by host molecules or sample media [E. H. Ellison, J. K. Thomas, Enhanced Quenching of Anthracene Fluorescence by Nitroalkanes in Zeolite X and Y, Langmuir. 17 (2001) 2446-2454; Y. B. Hao, Z. S. Shao, C. Cheng, X. Y. Xie, J. Zhang, W. J. Song, H. S. Wang, Regulating Fluorescent Aptamer-Sensing Behavior of Zeolitic Imidazolate Framework (ZIF-8) Platform via Lanthanide Ion Doping, ACS Applied Materials and Interfaces. 11 (2019) 31755-31762; H. Zhang, J. Liu, B. Wang, K. Liu, G. Chen, X. Yu, J. Li, J. Yu, Zeolite-confined carbon dots: tuning thermally activated delayed fluorescence emission via energy transfer, Materials Chemistry Frontiers. 4 (2020) 1404-1410].

Alkali-metal zeolites X and Y, for instance, can control anthracene fluorescence produced through the oxidative electron transfer mechanism [E. H. Ellison, J. K. Thomas, Enhanced Quenching of Anthracene Fluorescence by Nitroalkanes in Zeolite X and Y, Langmuir. 17 (2001) 2446-2454]. Moreover, transition metal incorporated zeolites were reported to be an active SERS substrate, as proceeded by Dutta [P. K. Dutta, D. Robins, Silver-Coated Faujasitic Zeolite Crystals as Surface-Enhanced Raman Spectroscopic Substrates, Langmuir. 7 (1991) 2004-2006], Huang [C. C. Huang, C. Y. Cheng, C. T. Chou, W. Chen, Adsorbate enrichment on a zeolite surface and assembly of a SERS sensor: a case study with silver nanoparticles and the flavonoid catechin, RSC Advances. 9 (2019) 6048-6053], Liu [N. Liu, M. Gong, P. Zhang, L. Li, W. Li, R. Lee, Silver-embedded zeolite crystals as substrates for surface-enhanced Raman scattering, Journal of Materials Science. 46 (2011) 3162-3168] and Dai [W. Yan, L. Bao, S. M. Mahurin, S. Dai, Silver-Coated Zeolite Crystal Films as Surface-Enhanced Raman Scattering Substrates, Applied Spectroscopy. 58 (2004) 18-25].

However, no substrate which is sufficiently sensitive and effective for detecting sulfur-containing compounds present in fuel samples, such as petrol, and diesel has yet been developed.

In view of the forgoing, one objective of the present disclosure is to describe a SERS substrate containing a silver-loaded silica/zeolite nanocomposite for the detection of sulfur-containing compounds. A further objective of the present disclosure is to provide a method for making the SERS substarte.

SUMMARY

In an exemplary embodiment, a surface-enhanced Raman scattering (SERS) is described. The SERS substrate includes a transparent substrate and a nanocomposite composition. The nanocomposite composition includes a silver-loaded silica ($Ag$—$SiO_2$) nanocomposite. The nanocomposite composition further includes a zeolitic material.

In some embodiments, the Ag—SiO$_2$ nanocomposite has a silica core and a silver/silica shell disposed around the silica core.

In some embodiments, the zeolitic material have a nano porous structure.

In some embodiments, the silver/silica shell contains silver nanoparticles uniformly distributed therein.

In some embodiments, the Ag—SiO$_2$ nanocomposite is uniformly disposed on a surface of the zeolitic material.

In some embodiments, the nanoparticles of the Ag—SiO$_2$ nanocomposite are spherical.

In some embodiments, the nanoparticles of the Ag—SiO$_2$ nanocomposite have a mean particle size of 100 to 500 nanometers (nm).

In some embodiments, the silica core of the Ag—SiO$_2$ nanocomposite has a mean diameter of 50 to 150 nm.

In some embodiments, the silver/silica shell of the Ag—SiO$_2$ nanocomposite has a mean thickness of 50 to 350 nm.

In some embodiments, the silver nanoparticles in the silver/silica shell of the Ag—SiO$_2$ nanocomposite have a mean particle size of 10 to 50 nm.

In some embodiments, the silver nanoparticles are at least one selected from the group consisting of nanospheres, nanorods, nanostars, nanotriangles, nanoprisms, nanocubes, nanofibers, nanoplates, nanowires, nanotetrahedrons, nanocrystals, nanohexagons, nanodisks, nanoribbons, nanocylinders, nanogranules, nanowhiskers, nanoflakes, nanofoils, nanopowders, nanoholes, nanobelts, nanourchins, nanoflowers, nanoislands, and nanomeshes.

In some embodiments, the Ag—SiO$_2$ nanocomposite has a specific surface area in a range of 10 to 100 square meter per gram (m$^2$/g). In some embodiments, the Ag—SiO$_2$ nanocomposite has a cumulative specific pore volume in a range of 0.1 to 0.15 cubic centimeter per gram (cm$^3$/g). In some embodiments, the Ag—SiO$_2$ nanocomposite has an average pore diameter of 6 to 10 nm. In some embodiments, the Ag—SiO$_2$ nanocomposite comprises from about 5 to 25 weight percentage (wt. %) of silver.

In some embodiments, a weight ratio of the silver-loaded silica nanocomposite to the zeolitic material in the nanocomposite ranges from about 1:5 to 5:1.

In some embodiments, the zeolitic material has a silicon-to-aluminum molar ratio of greater than 10:1.

In some embodiments, the zeolitic material has a specific surface area in a range of 300 to 400 m$^2$/g. In some embodiments, the zeolitic material has a cumulative specific pore volume in a range of 0.15 to 0.2 cm$^3$/g. In some embodiments, the zeolitic material has an average pore diameter of 3 to 6 nm.

In some embodiments, the SERS substrate has a specific surface area in a range of 150 to 300 m$^2$/g. In some embodiments, the SERS substrate has a cumulative specific pore volume in a range of 0.2 to 0.3 cm$^3$/g. In some embodiments, the SERS substrate has an average pore diameter of 4 to 7 nm.

In some embodiments, the SERS substrate have a detection limit of $1\times10^{-9}$ molar (M) for a sulfur-containing compounds.

In some embodiments, the transparent substrate includes a glass substrate. In some embodiments, the glass substrate is at least one selected from the group consisting of a fluorine doped tin oxide (FTO) coated glass substrate, a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate.

In another exemplary embodiment, a method of forming the SERS substrate is described. The method includes preparing the nanocomposite composition. In some embodiments, the nanocomposite composition is prepared by mixing a first silica precursor compound, an alcohol, and an ammonia solution to form a silica mixture. The nanocomposite composition is further prepared by sonicating a second silica precursor compound with the silica mixture and mixing to form a modified silica mixture. The nanocomposite composition is further prepared by dropwise adding a silver salt solution to the modified silica mixture and cooling to form a crude mixture containing a silver-loaded silica nanocomposite precipitate. The nanocomposite composition is further prepared by separating the silver-loaded silica nanocomposite precipitate from the crude mixture and drying to form the silver-loaded silica (Ag—SiO$_2$) nanocomposite. The nanocomposite composition is further prepared by calcinating a zeolitic precursor compound at a temperature of at least 500° C. to form the zeolitic material. The nanocomposite composition is further prepared by mixing the silver-loaded silica nanocomposite with the zeolitic material to form the nanocomposite composition. In some embodiments, a weight ratio of the silver-loaded silica nanocomposite to the zeolitic material in the nanocomposite composition ranges from about 1:5 to 5:1.

In some embodiments, the first silica precursor compound includes tetraethyl orthosilicate (TEOS), and tetramethyl orthosilicate (TMOS). In some embodiments, a volume ratio of the first silica precursor compound to the alcohol is in a range of 1:1 to 8:1. In some embodiments, a volume ratio of the first silica precursor compound to the ammonia solution is in a range of 2:1 to 8:1

In some embodiments, the alcohol has a formula (I)

in which R$_1$ and R$_2$ are each independently selected from the group consisting of hydrogen, alkanes, alkenes, alkynes, cyclic alkanes, cyclic alkenes, cyclic alkynes and aromatics having in the range of 1 to 20 carbon atoms. In some embodiments, the ammonia solution has a concentration of 0.5 to 2 M.

In some embodiments, the second silica precursor compound includes alkoxysilane compound. In some embodiments, the alkoxysilane compound is at least one selected from the group consisting of trimethoxy(octadecyl)silane, octadecyltrichlorosilane and octyldimethylchlorosilane. In some embodiments, a volume ratio of the first silica precursor compound to the second silica precursor compound is in a range of 1:3 to 3:1.

In some embodiments, the silver salt is at least one salt selected from the group consisting of silver nitrate, silver sulfate, silver carbonate and silver chloride. In some embodiments, the zeolitic precursor compound includes ammonium zeolite having a silicon-to-aluminum molar ratio of greater than 10:1.

In another exemplary embodiment, a method of obtaining a Raman spectrum of a sulfur-containing compound in a mixing composition is described. The method includes contacting the mixing composition containing the analyte with the SERS substrate to form a sample. The method includes exposing the sample to laser light such that a portion of the laser light is scattered by the sample to form scattered light. The method includes detecting the scattered light. In some embodiments, the mixing composition comprises one or more hydrocarbons having boiling points less than 500° C. In some embodiments, the sulfur-containing compound has a Raman scattering signal that is enhanced relative to that of the sulfur-containing compound in the absence of the SERS substrate.

In some embodiments, the sulfur-containing compound includes thiophene, dibenzothiophene (DBT), benzothiophene, 2-methylbenzothiophene, 2,4-dimethylthiophene, 3-methylthiophene, 2-methylthiophene, and/or a mixture thereof.

In some embodiments, the laser light has a wavelength of 600 to 650 nm. In some embodiments, the SERS substrate can detect the sulfur-containing compound with a detection limit of $1\times10^{-9}$ M.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4A is a graph depicting Fourier transform infrared (FT-IR) spectra of the $Ag-SiO_2$ nanoparticles, the Z-150 and the $Ag-SiO_2$-Z-150 nanocomposite, according to certain embodiments of the present disclosure;

FIG. 4B is a graph depicting powder X-ray diffraction (P-XRD) patterns of the $Ag-SiO_2$ nanoparticles, the Z-150, and the $Ag-SiO_2$-Z-150 nanocomposite, according to certain embodiments of the present disclosure;

FIG. 7A is a graph depicting suppression of fluorescence background in diesel samples using various $Si/Al_2$ ratios of H-ZSM-5 (Z-30, Z-80, Z-150 and Z-280), according to certain embodiments of the present disclosure;

FIG. 7B shows Raman spectra of pure diesel compared with the DBT analyte (0.1 M) without (normal Raman), with the (SERS) $Ag-SiO_2$ nanoparticles, with the Z-150, and with the (SERS) $Ag-SiO_2$-Z-150 nanocomposite, all in diesel medium, according to certain embodiments of the present disclosure;

DETAILED DESCRIPTION

Figure 1A:
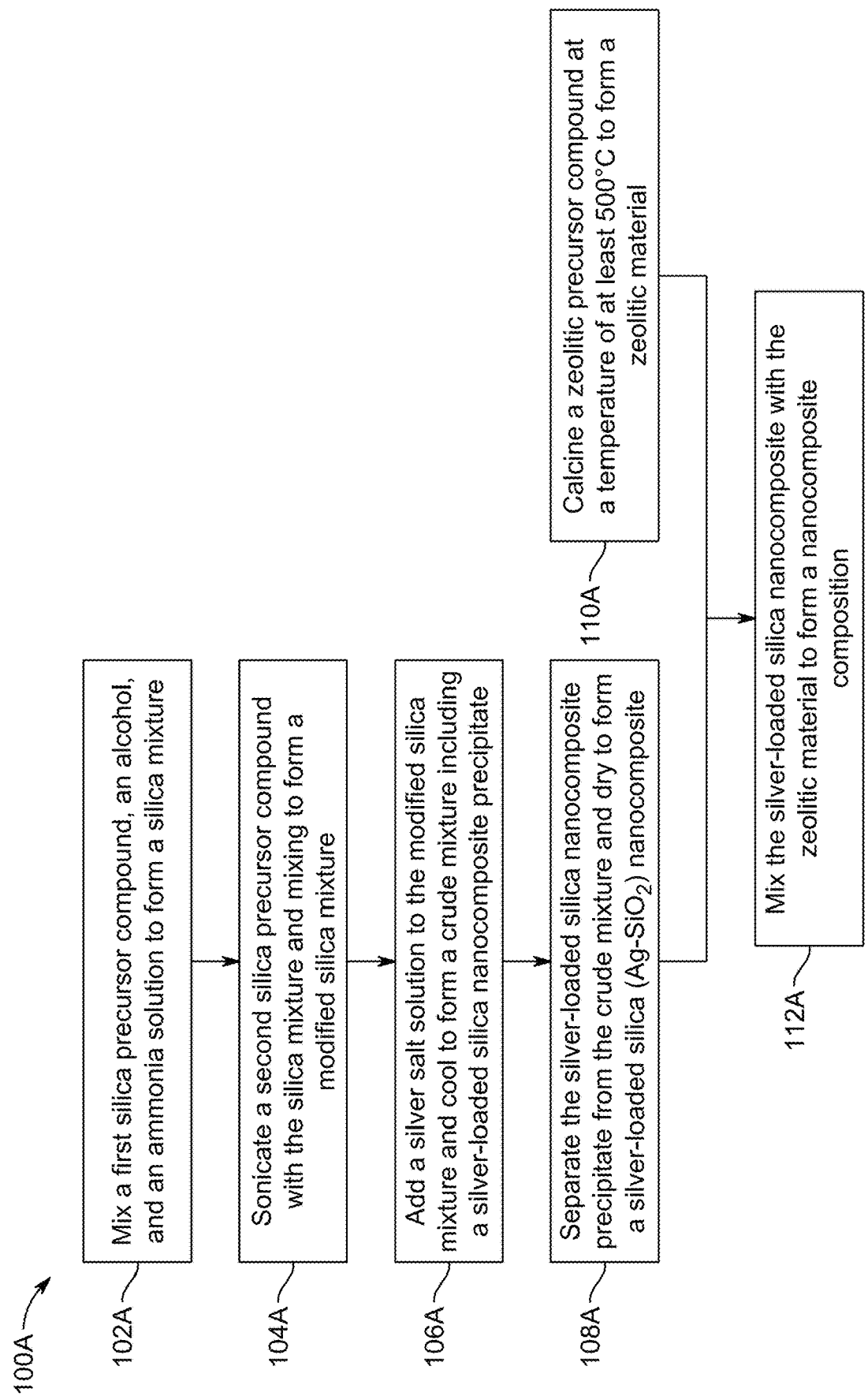
FIG. 1A is a schematic flow chart of a method of forming a surface-enhanced Raman scattering (SERS) substrate containing a silver-loaded silica/H-ZSM-5 nanocomposite, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a nanocomposite composed of silver-loaded silica nanoparticles, and a zeolitic material for use as a surface-enhanced Raman scattering (SERS) substrate. The substrate of the present disclosure is sensitive and is effective in the detection of sulfur-containing compounds in fuel samples, such as petrol and diesel. Although the description provided herein refers to the use of the substrate for detecting a class of sulfur containing compounds, such as dibenzothiophene (DBT), it may be understood by a person skilled in the art, that aspects of the present disclosure may be used for identification of other sulfur-containing compounds having similar chemical structures as well, albeit with a few variations, as may be obvious to a person skilled in the art. Compounds containing other chalcogenides such as selenium and tellurium may also be detected using the SERS substrate described herein. The silver nanoparticles in the nanocomposite enhances Raman signals associated with the DBT molecules, while the zeolitic material helps in reducing a fluorescence background, resulting in a low detection level (up to $10^{-7}$ molar (M)).

According to an aspect of the present disclosure, a SERS substrate is described. The SERS substrate includes a transparent substrate and a nanocomposite composition. The transparent substrate or the 'substrate' includes a glass substrate. In some embodiments, the glass substrate is at least one selected from the group consisting of a fluorine doped tin oxide (FTO) coated glass substrate, a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate.

In certain embodiments, the substrate may have a thickness of less than or equal to about 3 mm, for example, ranging from about 0.1 mm to about 2.5 mm, from about 0.3 mm to about 2 mm, from about 0.7 mm to about 1.5 mm, or from about 1 mm to about 1.2 mm, including all ranges and subranges therebetween. Other ranges are also possible.

The nanocomposite composition includes a silver-loaded silica (Ag—$SiO_2$) nanocomposite having a silica core, and one or more layers of silver/silica shell disposed around the silica core. In some embodiments, the Ag—$SiO_2$ nanocomposite includes silver in the form of silver ions and silver nanoparticles. In some further embodiments, the silver nanoparticles dispersed in the Ag—$SiO_2$ nanocomposite are uniformly dispersed/distributed in the silver/silica shell with little or no aggregation. In some preferred embodiments, this may provide an advantage since agglomeration or aggregation of the Ag—$SiO_2$ nanocomposite can affect the properties, including transparency, of the SERS substrate. In some further preferred embodiments, the silver nanoparticles of the Ag—$SiO_2$ nanocomposite are uniformly distributed in the silver/silica shell. In some most preferred embodiments, the weight percentage of silver in Ag—$SiO_2$ nanocomposite is about 5-25 wt. %, preferably about 7.5 to 22.5 wt. %, preferably about 10 to 20 wt. %, preferably about 12.5 to 17.5 wt. %, or even more preferably about 15-20 wt. %. Other ranges are also possible.

In some embodiments, the silver nanoparticles can be in the form of nanospheres, nanorods, nanostars, nanotriangles, nanoprisms, nanocubes, nanofibers, nanoplates, nanowires, nanotetrahedrons, nanocrystals, nanohexagons, nanodisks, nanoribbons, nanocylinders, nanogranules, nanowhiskers, nanoflakes, nanofoils, nanopowders, nanoholes, nanobelts, nanourchins, nanoflowers, nanoislands, and nanomeshes. In a preferred embodiment, the nanoparticles are spherical and have a mean particle size of 100 to 500 nm, preferably 150 to 450 nm, preferably 200 to 400 nm, preferably 250 to 350 nm, and yet more preferably about 300 nm. In some further preferred embodiments, the nanoparticles have a mean particle size of 10 to 50 nm, more preferably 20 to 40 nm, and yet more preferably 25 to 35 nm. Other ranges are also possible.

The Ag—$SiO_2$ nanocomposite may be amorphous or crystalline. In some embodiments, it is preferred that the Ag—$SiO_2$ nanocomposite are amorphous in nature. In some further embodiments, the silica core of the Ag—$SiO_2$ nanocomposite has a mean diameter of 50 to 150 nanometers (nm), more preferably 80 to 130 nm, and yet more preferably 100 to 120 nm. In some more preferred embodiments, the silver/silica shell of the Ag—$SiO_2$ nanocomposite has a mean thickness of 50 to 350 nm, more preferably 100 to 300 nm, yet more preferably 150 to 250 nm, and even more preferably about 200 nm. Other ranges are also possible.

The Ag—$SiO_2$ nanocomposite can be prepared by any of the methods conventionally known in the art; however, it is desirable for the Ag—$SiO_2$ nanocomposite to possess the following properties: a specific surface area in a range of 10 to 100 square meter per gram ($m^2/g$), more preferably 20 to 80 $m^2/g$, and yet more preferably 30 to 75 $m^2/g$; a cumulative specific pore volume in a range of 0.1 to 0.15 cubic centimeter per gram ($cm^3/g$), more preferably 0.12 to 0.14 $cm^3/g$; and an average pore diameter of 6 to 10 nm, more preferably 7 to 9 nm, and yet more preferably 8 to 8.5 nm.

The nanocomposite composition further includes a zeolitic material having a nano-porous structure. In some embodiments, the Ag—$SiO_2$ nanocomposite is uniformly disposed on a surface of the zeolitic material. In some further embodiments, a weight ratio of the Ag—$SiO_2$ nanocomposite to the zeolitic material in the nanocomposite ranges from about 1:5 to 5:1, preferably about 1:3 to 3:1, or more preferably about 1:1. Zeolites are alumino-silicate nanoporous, crystalline solids having regular arrays of molecule-sized nanopores that allow for shape- and size-selective adsorption, diffusion, and reaction of adsorbed guest molecules. The zeolites are generally shown by $xM_{2/n}O\cdot Al_2O_3\cdot ySiO_2\cdot zH_2O$, where 'M' represents an ion-exchangeable metal ion, which is usually the ion of a monovalent or divalent metal; n corresponds to the valence of the metal; x is a coefficient of the metal oxide; y is a coefficient of silica; and z is the number of water of crystallization. Various kinds of zeolites having different component ratio, fine pore diameter, and specific surface area are known. In some embodiments, the zeolitic material of the present disclosure has a specific surface area in a range of 300 to 400 $m^2/g$, more preferably 320 to 380 $m^2/g$; a cumulative specific pore volume in a range of 0.15 to 0.2 $cm^3/g$, more preferably 0.16 to 0.18 $cm^3/g$; and an average pore diameter of 3 to 6 nm, more preferably 4 to 5.5 nm. Other ranges are also possible.

One of the key factors that may affect the properties of the SERS substrate is the ratio of silica to alumina in the zeolitic material. In some embodiments, the zeolitic material is Zeolite Socony Mobil-5 (ZSM-5). H-ZSM-5 (Z) is a class of zeolites composed of several pentasil units linked together by oxygen bridges to form the pentasil chains. Such a class is characterized with a high silicon-to-aluminum ratio. In an embodiment, the weight ratios of silica to alumina ($Si/Al_2$) in ZSM-5 are greater than 10:1. More specifically, weight ratios of silica to alumina in the ZSM-5 are in a range of 30:1 to 280:1, more specifically, 30:1, 80:1, 150:1, and 280:1. In a preferred embodiment, the weight ratio of silica to alumina in ZSM-5 is 150:1. Other ranges are also possible.

The crystalline structures of the zeolitic material, the Ag—$SiO_2$ nanocomposite, and a silver-loaded silica/zeolite nanocomposite may be characterized by powder X-ray diffraction (P-XRD), respectively. In some embodiments, the XRD patterns are collected in a Bruker D8 Advance diffractometer equipped with a Cu-Kα radiation source (2=0.15406 nm) for a 2θ range extending between 5 and 80°, preferably 15 and 70°, further preferably 30 and 60° at an angular rate of 0.005 to 0.04° s-1, preferably 0.01 to 0.03° s-1, or even preferably 0.02° s-1. In some embodiments, the zeolitic material has at least a first intense peak with a 2 theta (θ) value in a range of 5 to 15° in a powder X-ray diffraction (P-XRD) spectrum, as depicted in FIG. 4B. In some embodiments, the zeolitic material has at least a second intense peak with a 2θ value in a range of 20 to 30° in the P-XRD spectrum, as depicted in FIG. 4B. Other ranges are also possible.

In some embodiments, the Ag—$SiO_2$ nanocomposite has at least a first intense peak with a 2 theta (θ) value in a range of 25 to 35° in a powder X-ray diffraction (P-XRD) spectrum, as depicted in FIG. 4B. In some preferred embodiments, the Ag—$SiO_2$ nanocomposite has at least a second intense peak with a 2θ value in a range of 40 to 50° in the P-XRD spectrum, as depicted in FIG. 4B. Other ranges are also possible.

In some further embodiments, the silver-loaded silica/zeolite nanocomposite has at least a first intense peak with a 2 theta (θ) value in a range of 5 to 15° in a powder X-ray diffraction (P-XRD) spectrum, as depicted in FIG. 4B. In some embodiments, the silver-loaded silica/zeolite nanocomposite has at least a second intense peak with a 2θ value in a range of 20 to 30° in the P-XRD spectrum, as depicted in FIG. 4B. In some further preferred embodiments, the silver-loaded silica/zeolite nanocomposite has at least a third intense peak with a 2θ value in a range of 30 to 35° in the P-XRD spectrum, as depicted in FIG. 4B. Other ranges are also possible.

Additionally, the structures of the zeolitic material, the Ag—$SiO_2$ nanocomposite, and the silver-loaded silica/zeolite nanocomposite are also characterized by the Raman spectroscopy as depicted in FIG. 4A. Raman spectra over the range of 200 to 3900 $cm^{-1}$ were obtained by using a HORIBA Scientific LabRAM HR Evolution Raman spectrometer. A He—Ne laser source equipped with two gratings (600 and 1800) with automated switching, and a CCD detector working at 633 nm excitation wavelength with 100% laser power was used for the measurements. An acquisition time of 25 s with 2 accumulations was set for the Raman spectra collection for bare and modified hematite films. In some embodiments, the zeolitic material has at least a first intense peak in a range of 800 to 1200 $cm^{-1}$, as depicted in FIG. 4A. In some embodiments, the zeolitic material has at least a second intense peak in a range of 2600 to 2900 $cm^{-1}$, as depicted in FIG. 4A. Other ranges are also possible.

In some further embodiments, the Ag—$SiO_2$ nanocomposite has at least a first intense peak in a range of 450 to 750 $cm^{-1}$, as depicted in FIG. 4A. In some preferred embodiments, the Ag—$SiO_2$ nanocomposite has at least a second intense peak in a range of 800 to 1500 $cm^{-1}$, as depicted in FIG. 4A. Other ranges are also possible.

In some further preferred embodiments, the silver-loaded silica/zeolite nanocomposite has at least a first intense peak in a range of 450 to 750 $cm^{-1}$, as depicted in FIG. 4A. In some more preferred embodiments, the silver-loaded silica/zeolite nanocomposite has at least a second intense peak in a range of 800 to 1500 $cm^{-1}$, as depicted in FIG. 4A. In some most preferred embodiments, the silver-loaded silica/zeolite nanocomposite has at least a third intense peak in a range of 2600 to 3000 $cm^{-1}$, as depicted in FIG. 4A. Other ranges are also possible.

Figure 5:
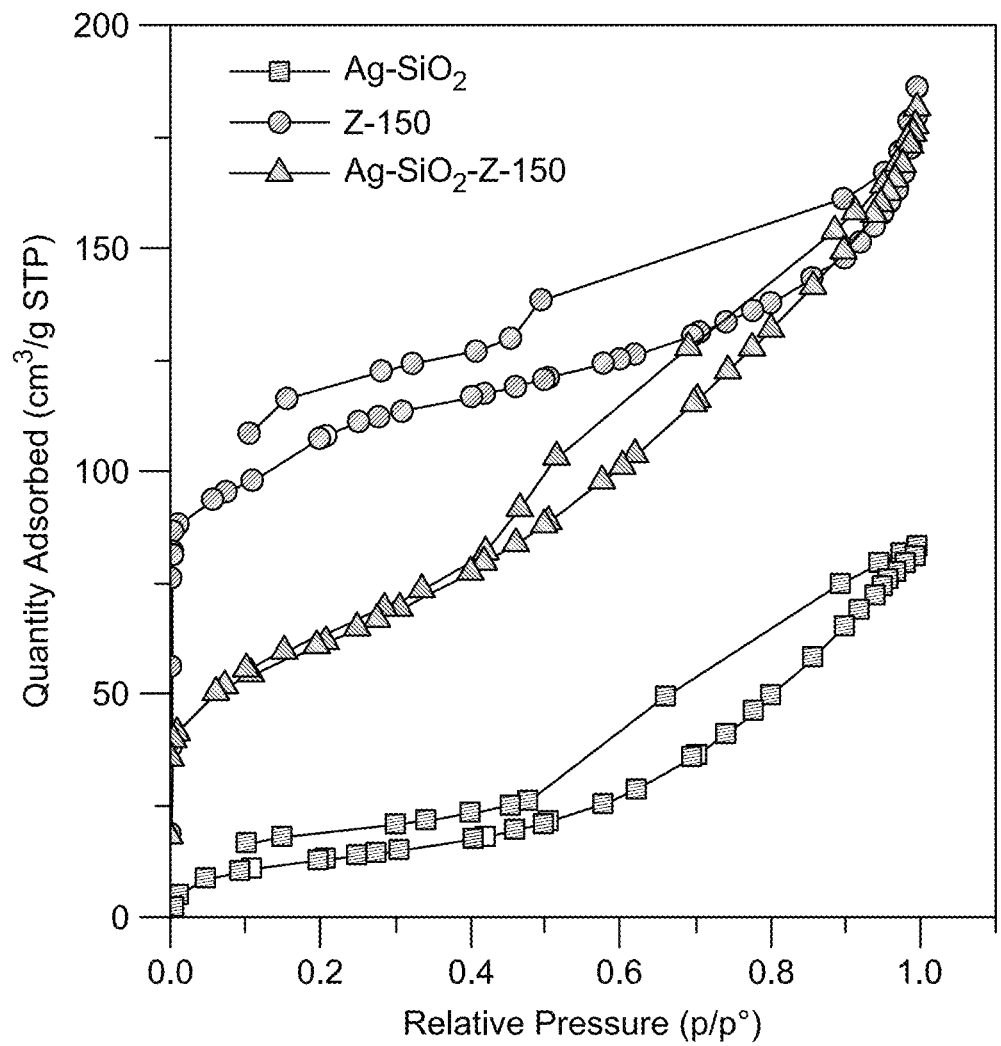
FIG. 5 is a graph depicting Brunauer-Emmett-Teller (BET) isotherms resulting from $N_2$ physisorption on the $Ag-SiO_2$ nanoparticles, the Z-150, and the $Ag-SiO_2$-Z-150 nanocomposite, according to certain embodiments of the present disclosure.

Moreover, the structures of the zeolitic material, the Ag—$SiO_2$ nanocomposite, and the silver-loaded silica/zeolite nanocomposite are also characterized by nitrogen adsorption/desorption measurements. In some embodiments, the nitrogen adsorption/desorption measurements are collected in a Micromeritics Tristar 3000, and results (e.g., surface area and pore size) are calculated using the Brunauer-Emmett-Teller (BET) and Barrett-Joyner-Halenda (BJH) methods. In some embodiments, the zeolitic material has a specific surface area in a range of 300 to 420 $m^2/g$, more preferably 320 to 400 $m^2/g$, and yet more preferably 340 to 380 $m^2/g$, as depicted in FIG. 5. In some further embodiments, the zeolitic material has a cumulative specific pore volume in a range of 0.1 to 0.25 $cm^3/g$, preferably 0.15 to 0.2 $cm^3/g$, or more preferably 0.16 to 0.18 $cm^3/g$, as depicted in FIG. 5. In some preferred embodiments, the zeolitic material has an average pore diameter of 3 to 6 nm, preferably 3.5 to 5.5 nm, preferably 4 to 5 nm, or even more preferably about 4.5 nm, as depicted in FIG. 5. Other ranges are also possible.

In some embodiments, the silver-loaded silica/zeolite nanocomposite has a specific surface area in a range of 180 to 260 $m^2/g$, more preferably 200 to 240 $m^2/g$, and yet more preferably 210 to 230 $m^2/g$, as depicted in FIG. 5. In some further embodiments, the silver-loaded silica/zeolite nanocomposite has a cumulative specific pore volume in a range of 0.15 to 0.35 $cm^3/g$, preferably 0.2 to 0.3 $cm^3/g$, or more preferably 0.23 to 0.27 $cm^3/g$, as depicted in FIG. 5. In some preferred embodiments, the silver-loaded silica/zeolite nanocomposite has an average pore diameter of 3 to 9 nm, preferably 4 to 8 nm, preferably 5 to 7 nm, or even more preferably about 6 nm, as depicted in FIG. 5. Other ranges are also possible.

In some embodiments, the Ag—$SiO_2$ nanocomposite has a specific surface area in a range of 10 to 80 $m^2/g$, more preferably 25 to 65 m²/g, and yet more preferably 40 to 50 m²/g, as depicted in FIG. 5. In some further embodiments, the Ag—SiO$_2$ nanocomposite has a cumulative specific pore volume in a range of 0.1 to 0.2 cm³/g, preferably 0.11 to 0.15 cm³/g, or more preferably 0.12 to 0.13 cm³/g, as depicted in FIG. 5. In some preferred embodiments, the Ag—SiO$_2$ nanocomposite has an average pore diameter of 6 to 12 nm, preferably 7 to 11 nm, preferably 8 to 10 nm, or even more preferably about 9 nm, as depicted in FIG. 5. Other ranges are also possible.

The nanocomposite composition of the present disclosure serves as an effective SERS substrate for sensitive detection of sulfur containing compounds in fuels and/or other hydrocarbon-based matrices. Suitable examples of sulfur-containing compounds include, but are not limited to, thiophene, DBT, benzothiophene, 2-methylbenzothiophene, 2,4-dimethylthiophene, 3-methylthiophene, 2-methylthiophene, 4,6-dimethyldibenzothiophene, 2,4,6-trimethyldibenzothiophene, and 2,3,4,7-tetramethylbenzothiophene, or a combination thereof. In a preferred embodiment, the SERS substrate of the present disclosure is effective in detection of DBT, with a detection limit of 1×10⁻⁹ molar (M).

In some embodiments, the SERS substrate has a specific surface area in a range of 150 to 300 m²/g, more preferably 180 to 250 m²/g, and yet more preferably 200 to 230 m²/g. In some further embodiments, the SERS substrate has a cumulative specific pore volume in a range of 0.2 to 0.3 cm³/g, preferably 0.22 to 0.28 cm³/g, or more preferably 0.24 to 0.26 cm³/g. In some embodiments, the SERS substrate has an average pore diameter of 4 to 7 nm, preferably 4.5 to 6.5 nm, preferably 5 to 6 nm, or even more preferably about 5.5 nm. Other ranges are also possible.

FIG. 1A illustrates a schematic flow chart of a method 100A of forming the SERS substrate. The method includes preparing the nanocomposite composition by following steps 102A-112A. The order in which the method 100A is described is not intended to be construed as a limitation, and any number of the described method steps can be combined in any order to implement the method 100A. Additionally, individual steps may be removed or skipped from the method 100A without departing from the spirit and scope of the present disclosure.

At step 102A, the method 100A includes mixing a first silica precursor compound, an alcohol, and an ammonia solution (such as ammonium hydroxide) to form a silica mixture. In some embodiments, a volume ratio of the first silica precursor compound to the alcohol is in a range of 1:1 to 8:1, preferably 2:1 to 7:1, preferably 3:1 to 6:1, or even more preferably 4:1 to 5:1. A volume ratio of the first silica precursor compound to the ammonia solution is in a range of 2:1 to 8:1, preferably 3:1 to 7:1, preferably 4:1 to 6:1, or even more preferably about 5:1. Other ranges are also possible.

In some embodiments, the first silica precursor compound includes tetraethyl orthosilicate (TEOS), and tetramethyl orthosilicate (TMOS). In some further embodiments, the alcohol may include methanol, ethanol, n-propyl alcohol, isopropyl alcohol, and t-butyl alcohol. In some preferred embodiments, the alcohol has a formula (I)

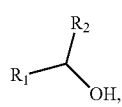

(I)

where R$_1$ and R$_2$ are each independently selected from the group consisting of hydrogen, alkanes, alkenes, alkynes, cyclic alkanes, cyclic alkenes, cyclic alkynes, and aromatics having in the range of 1 to 20 carbon atoms. The ammonia solution has a concentration of 0.5 to 2 M, more preferably 0.8 to 1.8 M, and yet more preferably 1 to 1.5 M. Other ranges are also possible.

At step 104A, the method 100A includes sonicating a second silica precursor compound with the silica mixture and mixing to form a modified silica mixture. In some embodiments, the second silica precursor compound includes alkoxysilane compound. As used herein, the term 'alkoxysilane compound' refers to the silane compound which includes alkoxy radicals. The alkoxysilane compound is at least one selected from the group consisting of trimethoxy(octadecyl)silane, octadecyltrichlorosilane and octyldimethylchlorosilane. In some embodiments, the alkoxysilane e compound may include Si(OMe)$_4$, MeSi(OMe)$_3$, MeSi(OCH$_2$CH$_2$OMe)$_3$, ViSi(OMe)$_3$, PhSi(OMe); and PhSi(OCH$_2$CH$_2$OMe)$_3$. A volume ratio of the first silica precursor compound to the second silica precursor compound is in a range of 1:3 to 3:1, preferably 1:2 to 2:1, or even more preferably about 1:1. Other ranges are also possible.

At step 106A, the method 100A includes dropwise adding a silver salt solution to the modified silica mixture and cooling to form a crude mixture containing a silver-loaded silica nanocomposite precipitate. The silver-loaded silica nanocomposite precipitate can be obtained by performing centrifugation in a range of 9,000-11,000 rotations per minute (rpm), preferably 9,500-10,500 rpm, more preferably about 10,000 rpm for about 5-90 minutes, preferably about 15-80 minutes, preferably about 25-70 minutes, preferably about 35-60 minutes, or even more preferably about 45 minutes at 5-30° C., preferably 5-20° C., or even more preferably about 10° C. In some embodiments, the silver salt is at least one salt selected from the group consisting of silver nitrate, silver sulfate, silver carbonate and silver chloride. In some embodiments, the silver salt may include silver 2,4-pentanedionate, silver acetate, silver benzoate hydrate, silver bis(trifluoromethylsulfonyl)imide, silver bromide, silver chromate, silver cyanate, silver cyclohexanebutyrate, silver diethyldithiocarbamate, silver heptafluorobutyrate, silver hexafluoroantimonate, and silver hexafluoroarsenate. The zeolitic precursor compound includes ammonium zeolite having a silicon-to-aluminum molar ratio of greater than 10:1. Other ranges are also possible.

At step 108A, the method 100A includes separating the silver-loaded silica nanocomposite precipitate from the crude mixture and drying to form the silver-loaded silica (Ag—SiO$_2$) nanocomposite. The separation of the silver-loaded silica nanocomposite precipitate from the crude mixture can be done by using any method used or known in the prior art.

At step 110A, the method 100A further includes calcinating a zeolitic precursor compound at a temperature of at least 500° C. to form the zeolitic material. Calcination of the zeolitic precursor compound can be performed for 1-12 hours, preferably 3-9 hours, or even more preferably 5-7 hours at a temperature in a range of 300-1000° C., preferably 400-800° C., or even more preferably 500-600° ° C. Other ranges are also possible.

At step 112A, the method 100A further includes mixing the silver-loaded silica nanocomposite with the zeolitic material to form the nanocomposite composition. In some embodiments, a weight ratio of the silver-loaded silica nanocomposite to the zeolitic material in the nanocomposite composition ranges from about 1:5 to 5:1, preferably about 1:4 to 4:1, preferably about 1:3 to 3:1, preferably about 1:2 to 2:1, or even more preferably about 1:1. Other ranges are also possible.

Figure 1B:
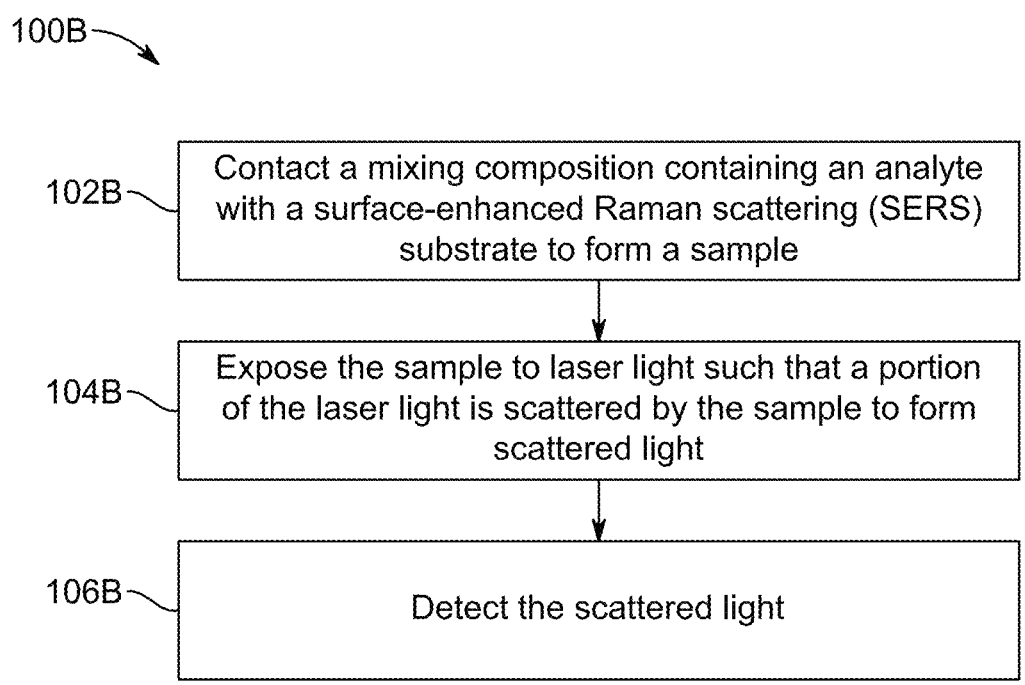
FIG. 1B is a schematic flow chart of a method of obtaining a Raman spectrum of an analyte in a mixing composition, according to certain embodiments of the present disclosure.

FIG. 1B illustrates a schematic flow chart of a method 100B of obtaining a Raman spectrum of an analyte in a mixing composition. The order in which the method 100B is described is not intended to be construed as a limitation, and any number of the described method steps can be combined in any order to implement the method 100B. Additionally, individual steps may be removed or skipped from the method 100B without departing from the spirit and scope of the present disclosure.

At step 102B, the method 100B includes contacting the mixing composition containing the analyte with the SERS substrate to form a sample. The mixing composition includes hydrocarbons having atmospheric boiling points that match the atmospheric boiling points of at least one of gasoline, kerosene, and diesel fuel. In some embodiments, the hydrocarbons may include benzene and naphthalene derivatives, dodecane, nonane, decane, and undecane. In some further embodiments, the hydrocarbons may also contain one or more sulfur-containing compounds, that form the analyte. Suitable examples of the analyte include, but are not limited to, thiophene, DBT, benzothiophene, 2-methylbenzothiophene, 2,4-dimethylthiophene, 3-methylthiophene, 2-methylthiophene, 4,6-dimethyldibenzothiophene, 2,4,6-trimethyldibenzothiophene, and 2,3,4,7-tetramethylbenzothiophene, or a combination thereof. In a preferred embodiment, the analyte is DBT. In some most preferred embodiments, the analyte has a Raman scattering signal that is enhanced relative to that of the analyte without contacting with the SERS substrate.

At step 104B, the method 100B includes exposing the sample to laser light such that a portion of the laser light is scattered by the sample to form scattered light. In some embodiments, the laser light has a wavelength of 600 to 650 nm, more preferably 620 to 640 nm for detecting the sulfur-containing compound with a detection limit of $1 \times 10^{-9}$ M. Other ranges are also possible.

At step 106B, the method 100B includes detecting the scattered light. In some embodiments, the scattered light may be detected by using various software or methods known in the art such as nephelometry, or turbidimetry. The intensity of the scattered light is indicative of the concentration of the analyte in the sample. In other words, a higher intensity of scattered light is indicative of a greater concentration of the analyte in the sample. The SERS substrate of the present disclosure may be used for detection of sulfur-containing compounds including DBT.

EXAMPLES

The following examples demonstrate exemplary embodiments of the SERS substrate described herein. The examples are provided solely for illustration and are not to be construed as limitations of the present disclosure, as many variations thereof are possible without departing from the spirit and scope of the present disclosure.

Example 1: Chemicals and Reagents

Silver nitrate (CAS Number: 7761-88-8, Purity >99%), tetraethyl orthosilicate (CAS Number: 78-10$^{-4}$, Purity >98%), trimethoxy(octadecyl)silane (CAS Number: 3069-42-9, Purity >96%), chloroform (CAS Number: 67-66-3, Purity >99.5%), ethanol (CAS Number: 64-17-5, Purity >99.9%), dimethyl sulfoxide (CAS Number: 67-68-5, Purity >99.9%), dibenzothiophene (CAS Number: 132-65-0, Purity >99%) were purchased from Sigma-Aldrich and used without further purification. Diesel oil (D2 Grade) was used for the analysis. ZSM-5 (ammonia form) material was purchased from Zeolyst International.

Example 2: Synthesis of Ag—SiO$_2$ Nanocomposites 50 milliliters (mL) tetraethyl orthosilicate, as a silane agent for the silica nanoparticles, was dissolved in 15 mL ethanol analytical grade for the manufacturing of silver/silica (Ag—SiO$_2$) nanocomposites. After being homogenized under stirring for 1 hour, the tetraethyl orthosilicate was hydrolyzed by adding 10 mL NH$_4$OH (1.0 M) under the N$_2$ atmosphere while stirring at room temperature (RT) for 5 hours. The mixtures were progressively reacted to obtain particle size increment and a transparent colloidal system. In addition, 10 mL of trimethoxy(octadecyl)silane was added to the system under vigorous stirring for surface modification. The mixture was subjected to ultrasonic treatment for 2 hours at 60 degrees Celsius (° C.), followed by magnetic stirring for 6 hours at 65° C. A dropwise addition of 10 mL of 0.1 M silver nitrate solution was added to this mixture. After cooling for 3 hours, the Ag-loaded core-shell Ag—SiO$_2$ nanocomposite material (Ag—SiO$_2$) (13.25 wt. %) was precipitated by centrifugation at 10000 rpm for 40 minutes at 10° C.

Example 3: Conversion of NH$_4$-ZSM-5 to H-ZSM-5 Materials (Z)

Various silica-alumina ratios of the H-ZSM-5 (Si/Al$_{2=30, 80, 150,}$ and 280) denoted as Z-30, Z-80, Z-150, and Z-280, respectively, were obtained after calcining NH$_4$-ZSM-5 at 550° C. for 6 hours. The zeolites thus prepared were used to study the effect on the SERS enhancement. The P-XRD pattern for the MFI structure confirmed the framework of such materials.

Example 4: Preparing the Combined Ag—SiO$_2$-Z-150 Nanocomposite

A 1:1 ratio of the Ag—SiO$_2$ and Z-150 was collected in a vial for characterization by FT-IR, XRD, and N$_2$-sorption. Notably, the mixture (1:1 ratio of the Ag—SiO$_2$ and Z-150) was kept in hexane for 10 minutes and then dried at 100° C. for an hour before subjecting to field emission scanning electron microscopy (FE-SEM) analysis. The prepared Ag—SiO$_2$-Z-150 material was confirmed to contain 6.33 wt. % of silver based on ICP-OES analysis.

Example 5: Characterization of the Nanomaterials

P-XRD was carried out using a Bruker D8 Advance diffractometer equipped with Ni-filtered Cu Kα radiation. The diffractograms were recorded from 2 theta (θ) of 5 to 80° at a step size of 0.02° with a dwell time of 0.5 seconds. Nitrogen adsorption/desorption measurements were performed using a Micromeritics Tristar 3000. Before each measurement, the samples were degassed under N$_2$ at 150° C. for 3 hours. The surface area and pore size were calculated using BET and Barrett-Joyner-Halenda (BJH) methods. To explore the morphological characteristics of the prepared Ag—SiO$_2$, Z-150, and combined Ag—SiO$_2$-Z-150 materials, FE-SEM images were recorded in the solid phase using a Thermo Scientific Quattro microscope at 10 kilovolts (kV) accelerating voltage and varied magnification and spatial resolution. The FT-IR spectra were acquired in the region of 3900-500 cm$^{-1}$ using a Perkin Elmer spectrometer, where the sample was loaded in powder form. The ICP-OES Horiba ULTIMA 2 instrument quantified the percentages of metals.

Example 6: Raman and SERS Measurements

The Raman and SERS spectra were acquired using a HORIBA LabRAM HR Evolution spectrometer with a He—Ne laser source, two gratings (600 and 1800) with automated switching, a charge-coupled device (CCD) detector, and the red laser line (633 nm) as an excitation source. The substrate dispersed with the nanocomposite composition was prepared by dispersing 10 milligrams (mg) of the nanocomposite in 5 mL of dimethyl sulfoxide (DMSO) or diesel. A 1 cm diameter and 1 cm depth glass cuvette were used to hold the sample solution, which included a 1:1 volume ratio of the target molecule and the nanocomposite. The sample was focused using the microscope's 50X objective lens and laser power of 25%. SERS spectra were taken with four accumulations and a 20-second acquisition duration during all trials in the present study. Before being exposed to SERS analysis, all sample solutions were dissolved either in DMSO or diesel.

Figure 2A:
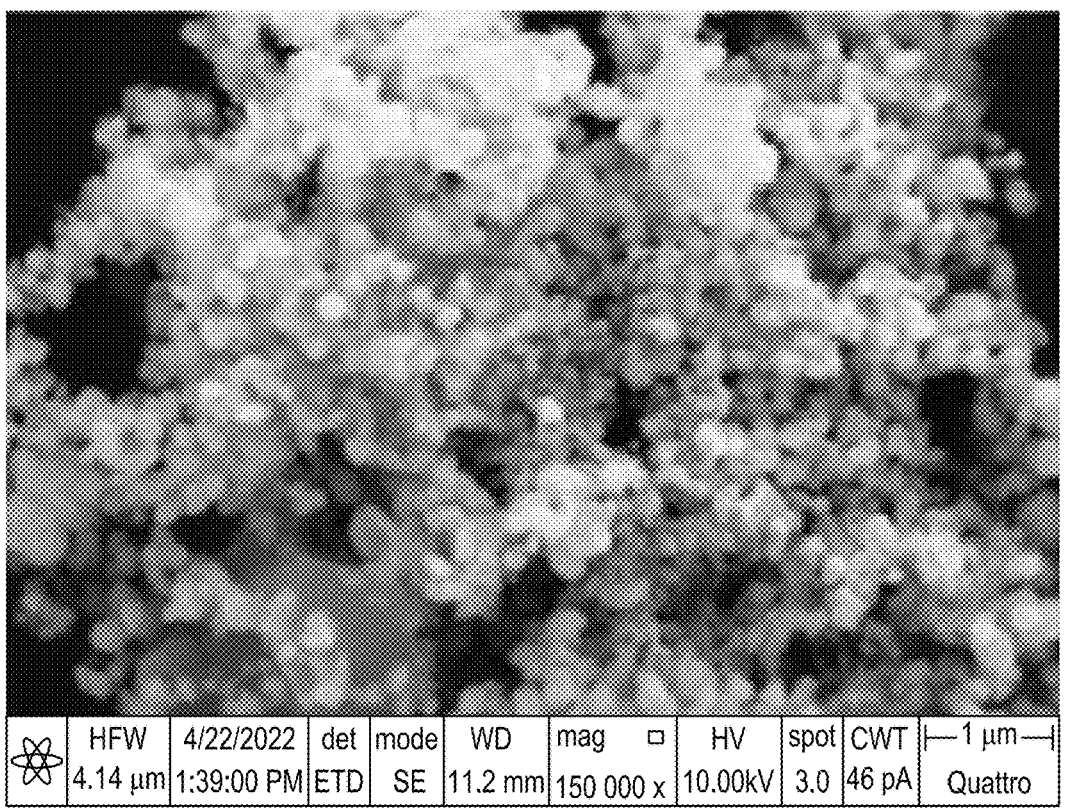
FIG. 2A is a scanning electron microscopy (SEM) image of silver-loaded silica ($Ag-SiO_2$) nanoparticles at magnification of 1 micrometer (μm), according to certain embodiments of the present disclosure.
Figure 2B:
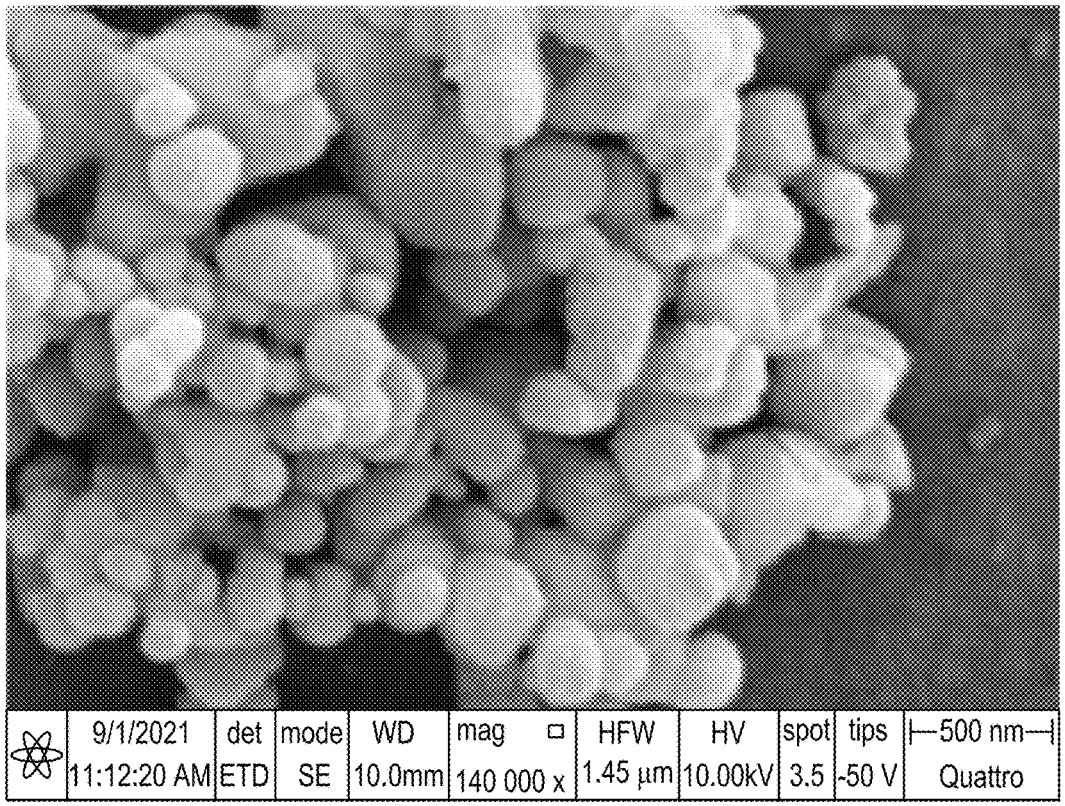
FIG. 2B is a SEM image of the $Ag-SiO_2$ nanoparticles at magnification of 500 nanometers (nm), according to certain embodiments of the present disclosure.
Figure 2C:
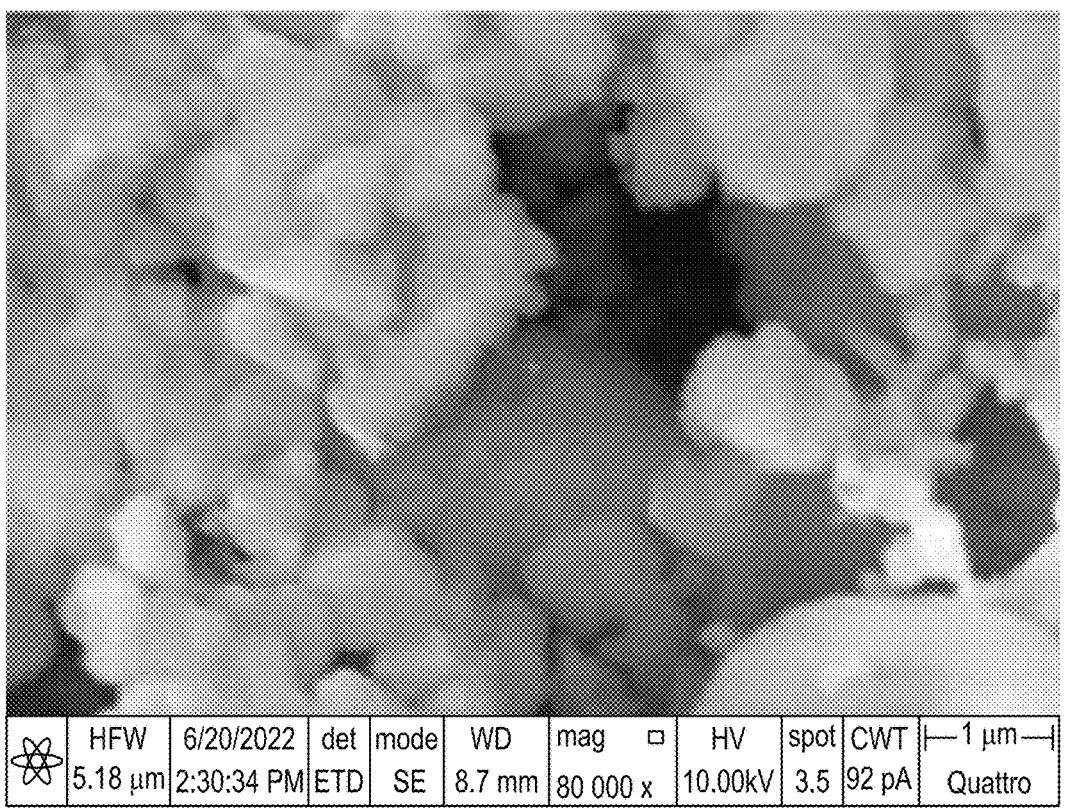
FIG. 2C is a SEM image of a zeolitic material, Z-150, at magnification of 1 μm, according to certain embodiments of the present disclosure.
Figure 2D:
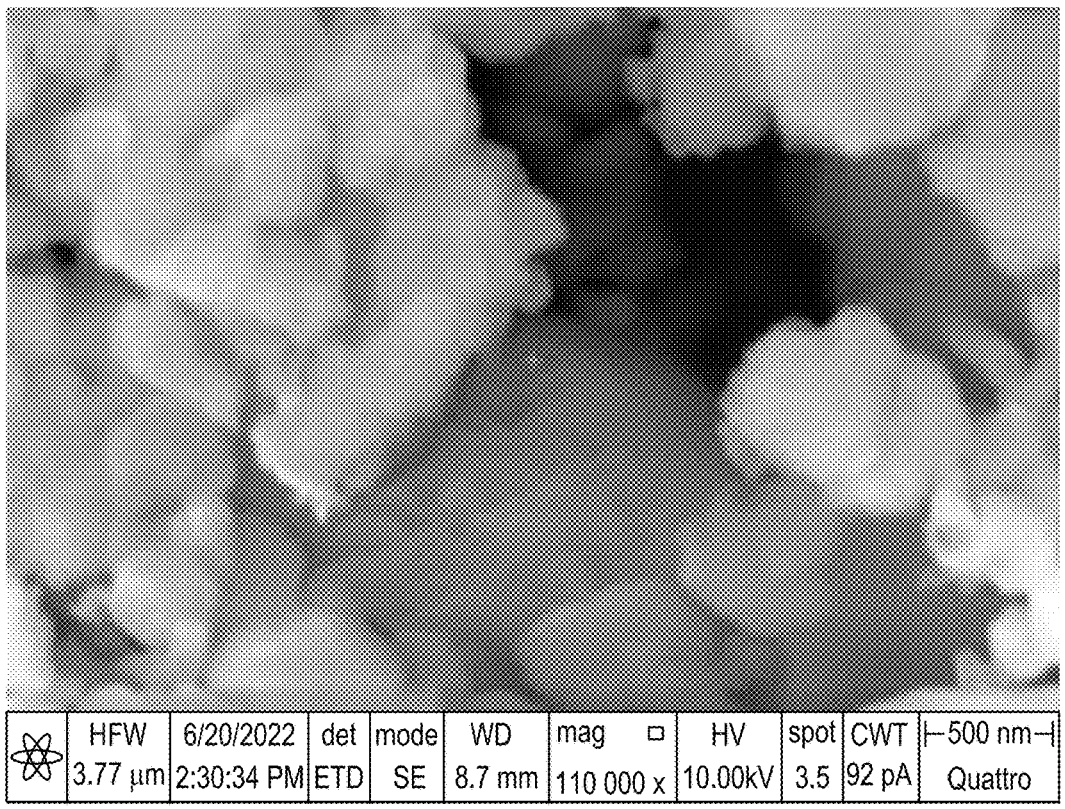
FIG. 2D is a SEM image of the Z-150 at magnification of 500 nm, according to certain embodiments of the present disclosure.
Figure 2E:
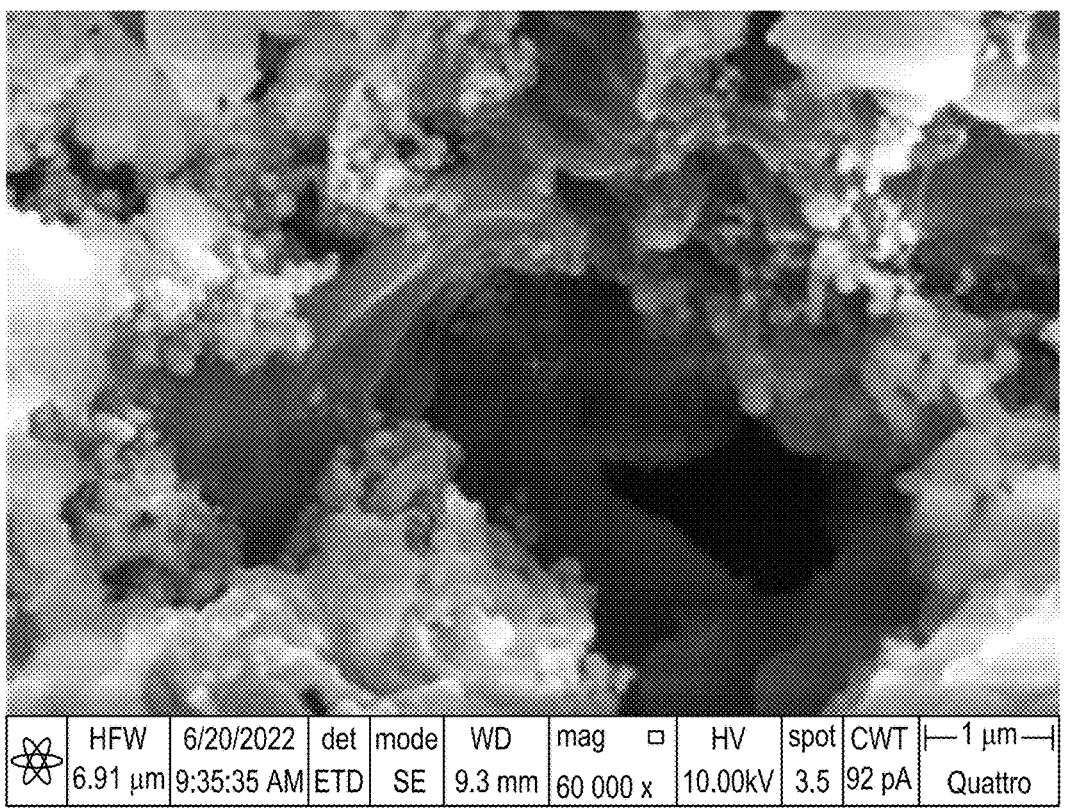
FIG. 2E is a SEM image of $Ag-SiO_2$-Z-150 nanocomposite at magnification of 1 μm, according to certain embodiments of the present disclosure.
Figure 2F:
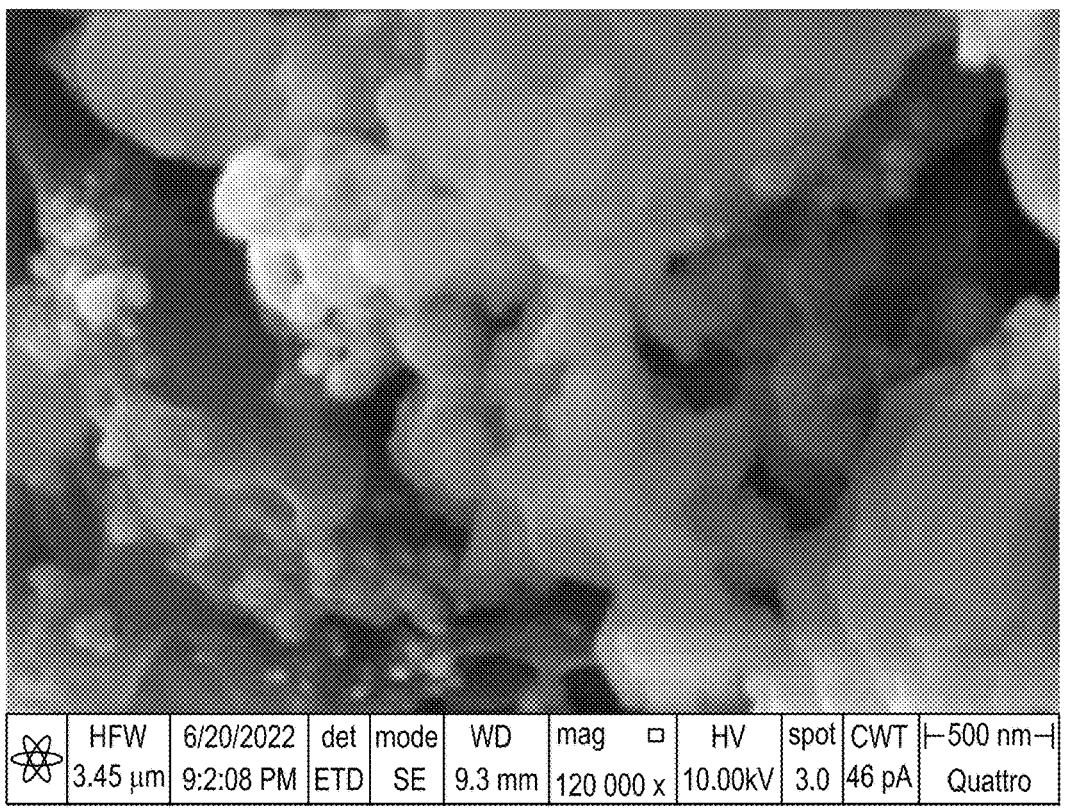
FIG. 2F is a SEM image of the $Ag-SiO_2$-Z-150 nanocomposite at magnification of 500 nm, according to certain embodiments of the present disclosure.
Figure 3C:
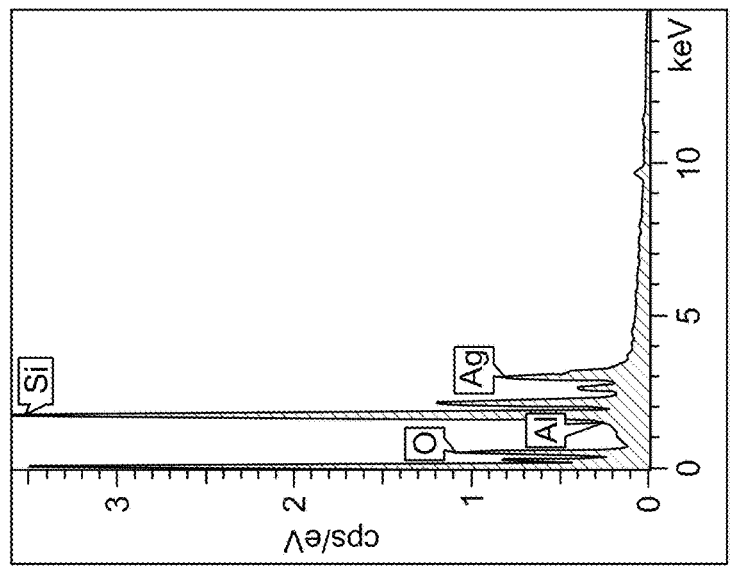
FIG. 3C is a graph depicting EDS analysis for the $Ag-SiO_2$-Z-150 nanocomposite, according to certain embodiments of the present disclosure.
Figure 3B:
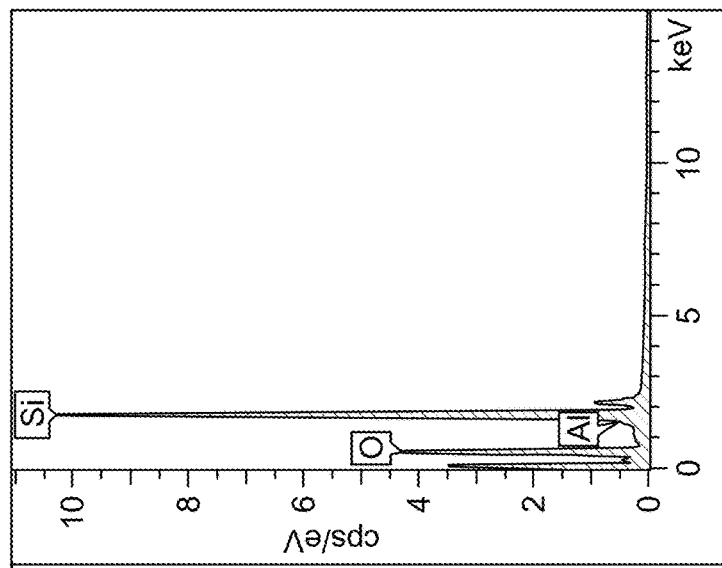
FIG. 3B is a graph depicting EDS analysis of the Z-150, according to certain embodiments of the present disclosure.
Figure 3A:
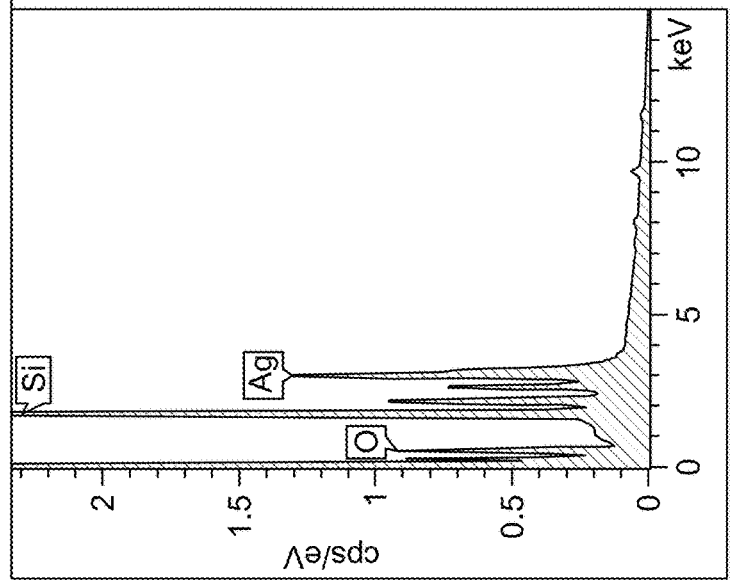
FIG. 3A is a graph depicting energy dispersive spectroscopy (EDS) analysis of the $Ag-SiO_2$, according to certain embodiments of the present disclosure.

Example 7: Characterization of the Ag—SiO$_2$, Z-150 and Ag—SiO$_2$-Z-150 Nanostructures The FT-IR, powder-XRD, and FE-SEM analyses confirmed the characteristics and morphology of the synthesized core-shell Ag—SiO$_2$ nanocomposite. Moreover, the Z-150 and Ag—SiO$_2$-Z-150 nanocomposites employed in the SERS investigation were characterized using the BET N$_2$-sorption technique to identify the underlying structure-absorbance relationship. The SEM images of the Z-150 and Ag—SiO$_2$-Z-150 nanocomposite, along with the energy dispersive spectroscopy (EDS), are presented in FIGS. 2A-3C The SEM images of the Ag—SiO$_2$ nanocomposite are displayed in FIGS. 2A-2F, which shows the silver-silica core (Ag—SiO$_2$ nanocomposite) is spherical with almost no sign of aggregation (FIG. 2A and FIG. 2B). The size of the obtained spheres of the Ag—SiO$_2$ nanocomposite is in the order of 300 nm (FIG. 2B). Comparing the morphologies of the fresh Z-150 (FIG. 2C and FIG. 2D) with the hybrid Ag—SiO$_2$-Z-250 nanocomposite (in FIG. 2E and FIG. 2F) evidenced for the successful combination of the hybrid nanocomposite. Additionally, the EDS analysis was utilized to determine the chemical composition of the materials. EDS spectra showed that the sample is composed of silicon, oxygen, and silver for the Ag—SiO$_2$ composite (FIG. 3A); the sample is composed of silicon, oxygen, and aluminum for the Z-150 (FIG. 3B); and the sample is composed of silicon, oxygen, silver, and aluminum for the Ag—SiO$_2$-Z-150 (FIG. 3C), which confirmed the expected constituent components of the nanostructured materials.

The FT-IR spectrum of the powdered Ag—SiO$_2$ nanocomposite (FIG. 4A) confirmed that the spherical core is composed of a (≡Si—O—Si≡) framework, as well as for the Z-150. The average infrared intensities associated with (≡Si—O—Si/Al≡) bands can be traced for the Ag—SiO$_2$-Z-150. The band range at 700-1100 cm$^{-1}$ showed the vibrations of Si—O and Al—O, while the band range at 950-1250 cm$^{-1}$ showed the vibrations of the asymmetry of Si—O and Al—O within the framework. Additionally, the characterization of the two-dimensional (2-D) structure of the Ag—SiO$_2$ and three-dimensional (3-D) structure of Z-150 nanomaterials by XRD is required to verify the crystallinity of the hybrid nanocomposite. The addition of the Ag—SiO$_2$ to the zeolitic platform did not affect the crystallinity of the original structure, as clearly depicted in FIG. 4B, indicating that the original nanostructured precursors retain corresponding chemical and physical properties within the newly formed nanocomposite. Notably, in the hybrid nanocomposite, Ag—SiO$_2$-Z-150, the presence of Ag—SiO$_2$ diffraction prominent peaks is labeled with asterisks (in FIG. 4B), and thereby remaining peaks originated from the Z-150 that is within MFI-framework.

The surface areas of the materials have been determined based on the BET analysis (FIG. 5) and are listed in Table 1.

TABLE 1

Vibrational assignment of the three critical SERS peaks of the DBT appearing in diesel media, along with the respective detection limits, linear dynamic ranges, and regression coefficients.

| SERS peak (cm$^{-1}$) | Assignment | LOD | LDR | R$^2$ |
|---|---|---|---|---|
| 1611 | CC stretching | $1.0 \times 10^{-7}$ | $10^{-1}$-$10^{-6}$ | 0.973 |
| 1333 | CH in-plane bending, CC stretching | $1.0 \times 10^{-6}$ | $10^{-1}$-$10^{-6}$ | 0.955 |
| 1039 | CS stretching | $1.0 \times 10^{-5}$ | $10^{-1}$-$10^{-5}$ | 0.914 |

The 2-D silica material has a considerably lower surface area. It is well-established that the generation of metal nanoparticles at silica surfaces induces an even lower surface area than pristine silica material, as metal nanoparticles tend to occupy the silica pores. Hence, the Ag—SiO$_2$ surface area was found to be 47 m$^2$/g. The surface area of the pristine material, Z-150, was found to be 368 m$^2$/g, which is higher than the case of the Ag—SiO$_2$-Z-150 nanocomposite. Notably, the higher and lower surface area of the zeolitic and silver silica materials were combined, resulting in an average surface area material. The BJH analysis was further employed to compare the pore sizes of the three materials (Table 2).

TABLE 2

Textural properties of materials based on the BET and BJH analyses.

| Material | BET Surface Area (m$^2$ g$^{-1}$) | BJH pore volume (cm$^3$ g$^{-1}$) | BJH pore width (nm) |
|---|---|---|---|
| Ag—SiO$_2$ | 45 | 0.127 | 8.78 |
| Z-150 | 368 | 0.175 | 4.54 |
| Ag—SiO$_2$—Z-150 | 215 | 0.248 | 5.75 |

It can be noticed that the pore volume improved when the Z-150 was combined with the core-shell silica. The surface textural properties suggested that adsorption and absorption have taken place between the surfaces of the two materials while combining the Z-150 and the Ag—SiO$_2$. The overall surface assessment confirmed a combination of type-IV and type-I isotherms characteristic of meso-nano porous materials.

Example 8: SERS Detection of DBT in DMSO

Figure 6A:
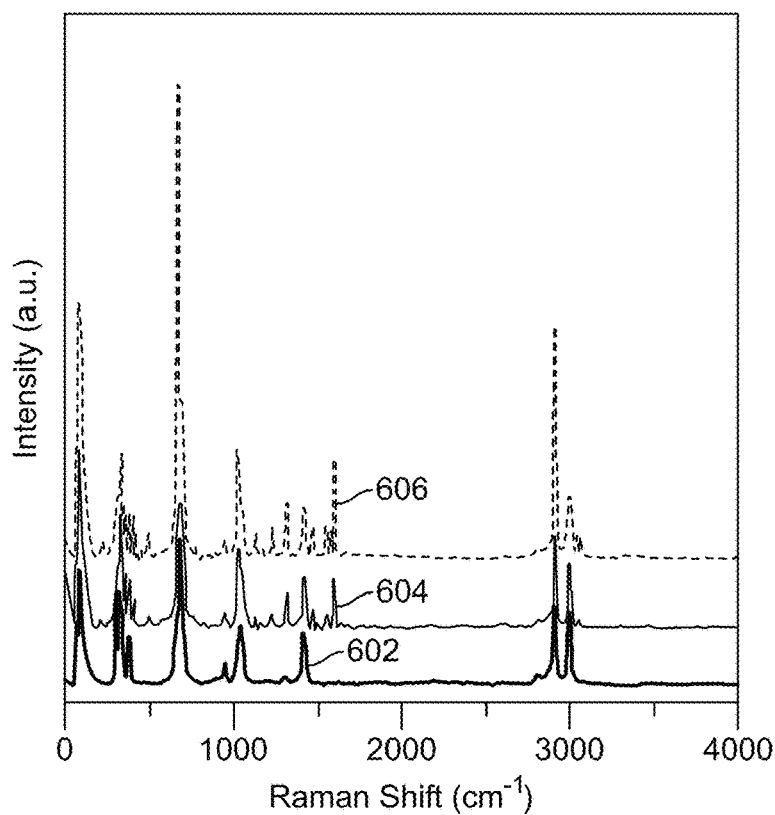
FIG. 6A is a graph depicting Raman spectra of pure dimethyl sulfoxide (DMSO) compared with dibenzothiophene (DBT) analyte (0.1 molar (M)) without (normal Raman) and with (SERS) the $Ag-SiO_2$ nanoparticles, both in the DMSO medium, according to certain embodiments of the present disclosure.

In the preliminary study, a 0.1 M concentration of the DBT analyte in dimethyl sulfoxide (DMSO) solvent was subjected to SERS analysis using the Ag—SiO$_2$ as substrate (FIG. 6A). Spectrum 602 corresponds to plain DMSO, while spectrum 604 corresponds to 0.1 M DBT dissolved in DMSO where the new Raman peaks appeared are assigned to the DBT. In particular, the non-SERS prominent DBT peak shown at 1599 cm$^{-1}$ is assigned to the aromatic C═C stretching vibration. Such a peak can be interesting to explore further using an appropriate SERS substrate. Spectrum 606 depicts the SERS effect, in which the DBT in DMSO is enhanced by employing the Ag—SiO$_2$. The peaks are enhanced due to the possible analyte interaction with the nanomaterial. Such a significant enhancement observed in the Raman intensities results from the high plasmonic light field resonance upon laser excitation of the roughened silver-modified surface.

Figure 6B:
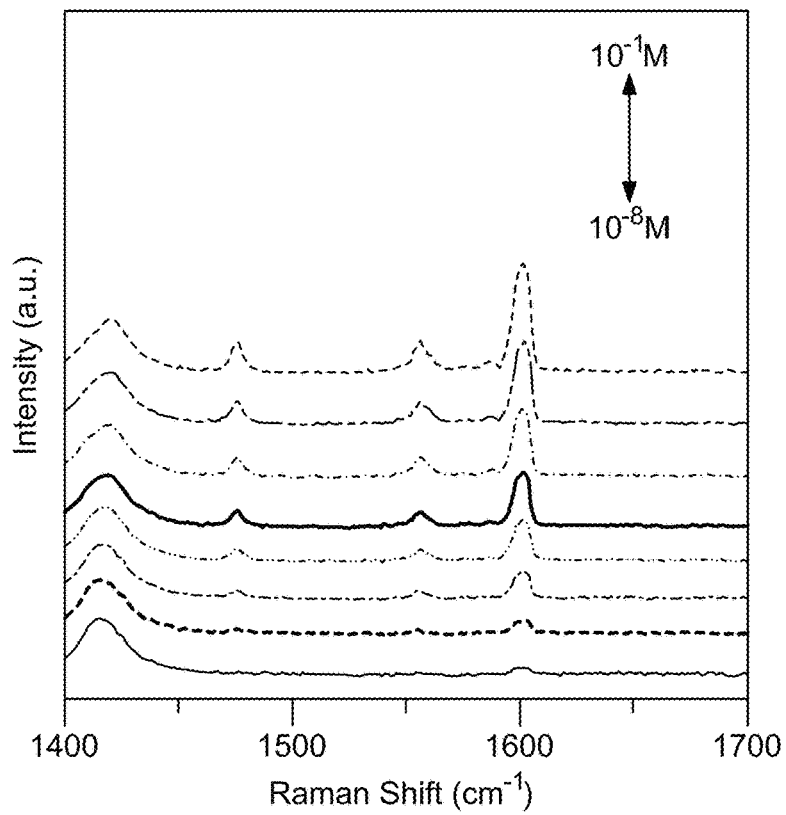
FIG. 6B is a graph depicting SERS spectra the DBT analyte, at various molar concentrations, using the $Ag-SiO_2$ nanoparticles in the DMSO solvent, according to certain embodiments of the present disclosure.
Figure 6C:
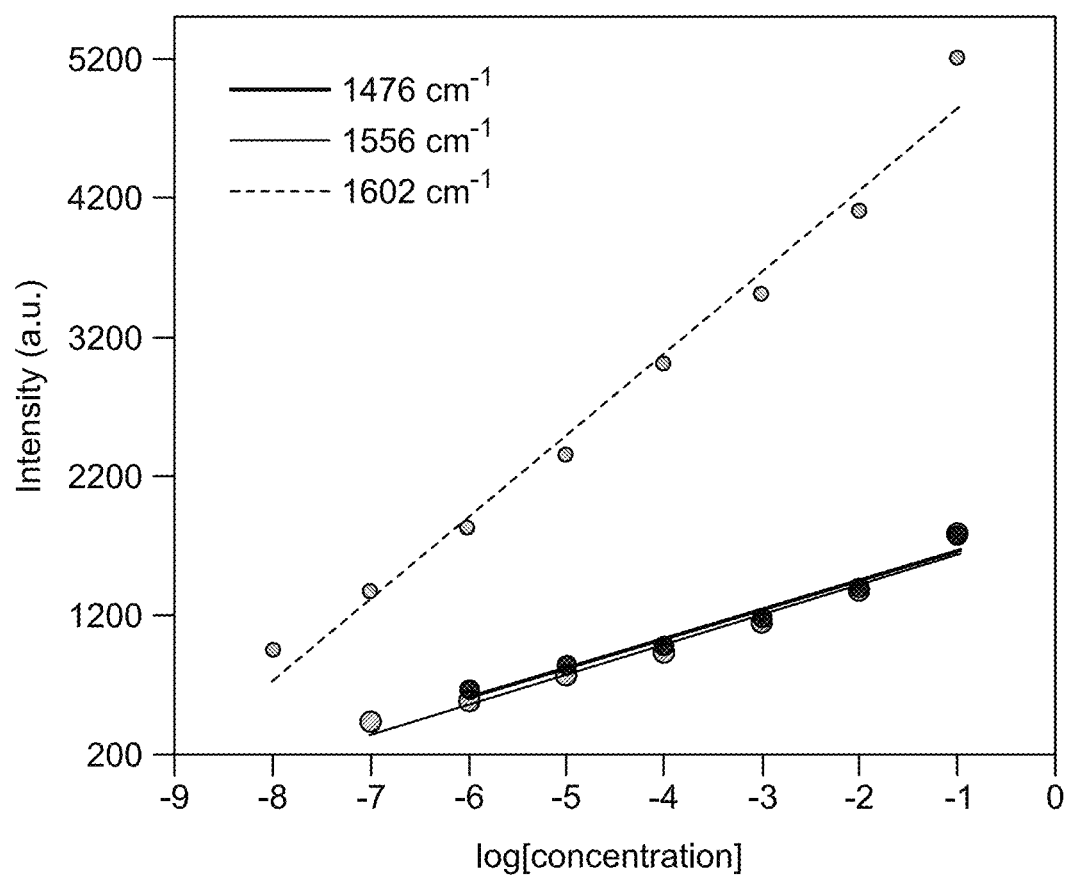
FIG. 6C is a graph depicting a linear correlation of different concentrations of the DBT with SERS intensities corresponding to SERS peaks appearing at 1602 $cm^{-1}$, 1556 $cm^{-1}$ and 1476 $cm^{-1}$, using the $Ag-SiO_2$ nanoparticles in the DMSO solvent, according to certain embodiments of the present disclosure.

Further analysis has been carried out with a different range of molar concentrations of the DBT in DMSO, namely from 10$^{-1}$ to 10$^{-8}$ M (FIG. 6B). The best representative SERS lines in the present approach were those whose intensities got significantly enhanced. The most conspicuous SERS peak of the DBT is the one appearing at 1602 cm$^{-1}$ (aromatic CC stretching corresponding to 1599 cm$^{-1}$ in the typical Raman spectrum), as illustrated in FIG. 6B. Nonetheless, the other two SERS peaks at 1556 cm$^{-1}$ and 1476 cm$^{-1}$ have exercised noticeable intensity enhancements and are assigned to ring deformation and CH asymmetric stretching vibration, respectively. The linear relationship of SERS response with the concentration of the DBT for these three peaks is presented in FIG. 6C. The SERS band at 1602 cm$^{-1}$ shows linearity in a wide range of the DBT concentrations (10$^{-1}$ to 10$^{-8}$ M) with a correlation coefficient of R$^2$=0.9819, and limit of detection (LOD) as 10$^{-9}$ M was achieved.

The Raman enhancement factor (EF) is a critical metric for assessing nanomaterial signal enhancement performance using the well-established method reported in the literature with the formula given in Equation (1):

$$EF = \frac{I_{SERS}}{I_{NRS}} \times \frac{C_{NRS}}{C_{SERS}} \quad (1)$$

where I$_{SERS}$ is the SERS mode intensity in the presence of the DBT and the substrate, and C SERS is the sample concentration, while INRS is the normal Raman mode intensity in the presence of the DBT without substrate, and C$_{NRS}$ is the sample concentration. The area of the 1611 cm$^{-1}$ Raman peak was utilized as the intensity of INRS Or I$_{SERS}$ because the present band is the strongest symmetric peak compared with others in the spectra. Consequently, the EF turned out to be 1.59×10$^6$.

Example 9: SERS detection of DBT in diesel

The study was further extended for the DBT sensing in real diesel media based on the results above. Silver-loaded silica core-shell was proven to serve as an active SERS substrate for sensing the DBT; therefore, the silver-loaded silica core-shell could be a potential candidate for real sample applications. The SERS analysis of the DBT in diesel was performed without DMSO solvent. However, the spectral response (FIG. 7A, spectrum 706 corresponding to DSL_Z-80) encountered a significant fluorescence background in most of the key DBT peaks and resulted in a broadening in the spectral range around 700 cm$^{-1}$. The fluorescence effect is believed to be caused by diesel constituents. Hence, a zeolitic formula could be used as a fluorescence suppressor in a diesel medium to proceed with the SERS analysis.

Several SERS analyses of spiked DBT in diesel samples have been performed by introducing the Z-150, as shown in FIG. 7B. Spectra 720 and 722 correspond to plain diesel and the DBT in diesel, respectively, in which a high fluorescence effect is encountered. Spectrum 712 corresponds to diesel with the Z-150, where the fluorescence background is reduced. Further, spectrum 714 corresponds to the DBT with the Z-150, where no enhancement of analyte peaks has appeared at ~1615 cm$^{-1}$, while spectrum 718 corresponds to the DBT in diesel with the Ag—SiO$_2$. where the DBT peak is enhanced. Still, fluorescence at the same time increased tremendously. The fluorescence dropped after adding the Z-150 with AgS (1:1) into the DBT in diesel (FIG. 7B, spectrum 716), and the DBT peak's enhancement was retained. Spectrum 702 corresponds to bare diesel. Before this, different Si/Al$_2$ ratios of the H-ZSM-5 (Z-30, Z-80, Z-150, and Z-280 correspond to spectra 704, 706, 708, 710) have been examined in diesel (FIG. 7A) to select the optimal composition that reduces the fluorescence interference in the Raman spectrum of diesel, and the Z-150 form was found to be the best fluorescence suppressant.

Figure 8B:
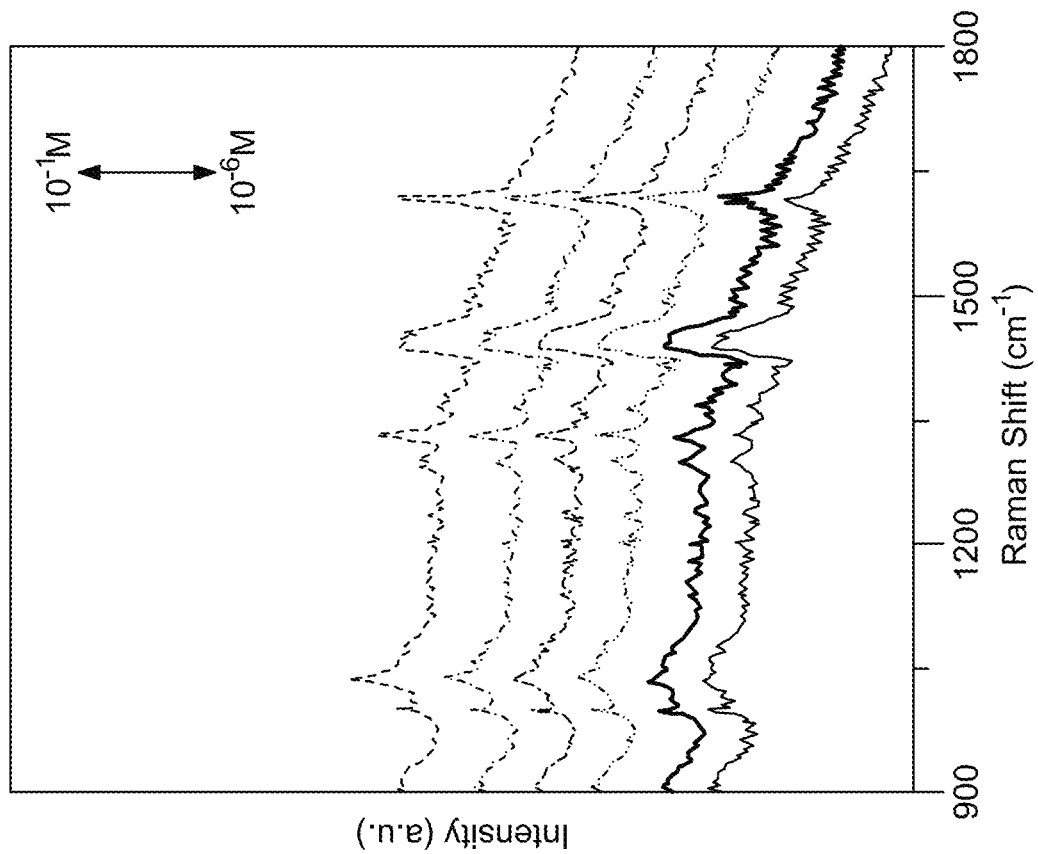
FIG. 8B is a SERS spectra in the region 900-1800 $cm^{-1}$ for various molar concentrations of the DBT analyte with the $Ag-SiO_2$-Z-150 nanocomposite, in diesel, according to certain embodiments of the present disclosure.
Figure 8A:
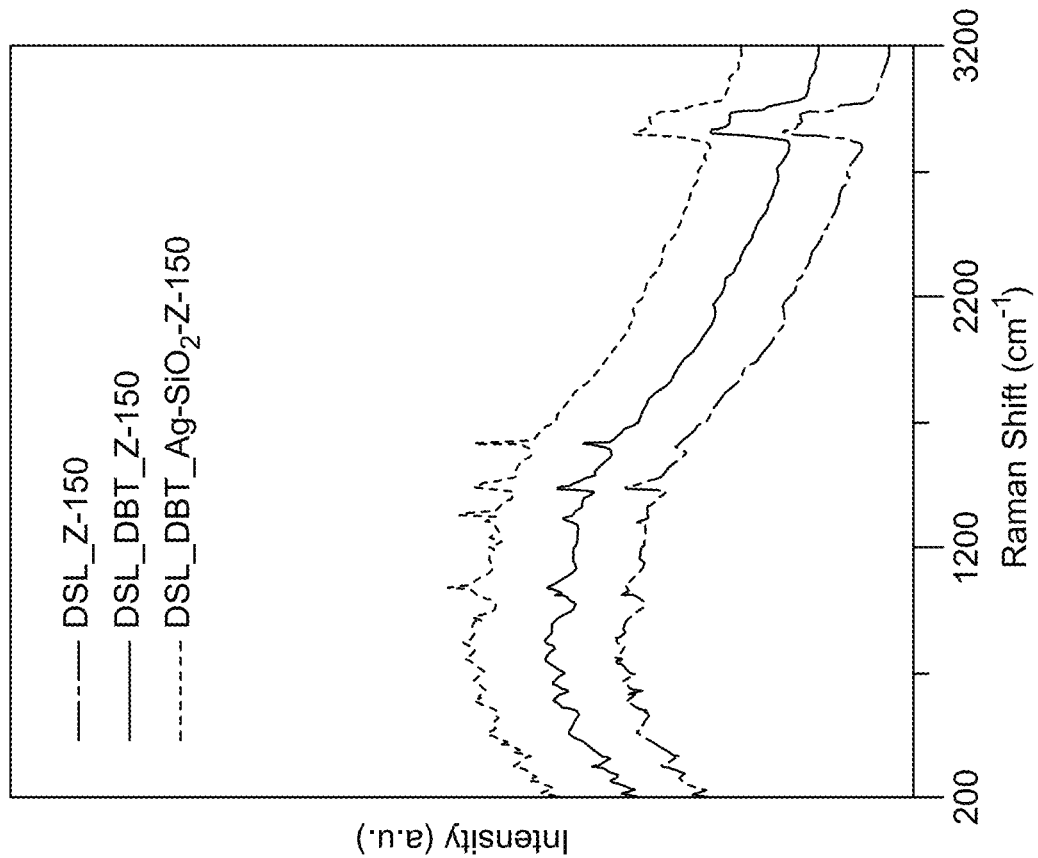
FIG. 8A is a graph depicting SERS spectra of diesel with Z-150, Z-150 spiked with DBT analyte, and the $Ag-SiO_2$-Z-150 nanocomposite spiked with the DBT analyte, according to certain embodiments of the present disclosure.

Furthermore, FIG. 8A focused on the main outcome of the results from FIGS. 7A-7B. It can be noted that diesel-like oils are associated with high fluorescence that could be reduced using the Z-150 nanoporous material. The SERS spectra of the DBT analyzed in diesel using the combined Ag—SiO$_2$-Z-150 material (FIG. 8B) revealed a set of prominent Raman peaks different than those identified in the DMSO solvent. It indicated that the presence of Z nanostructure influenced the interaction of the DBT with the silver nanoparticles.

Figure 8C:
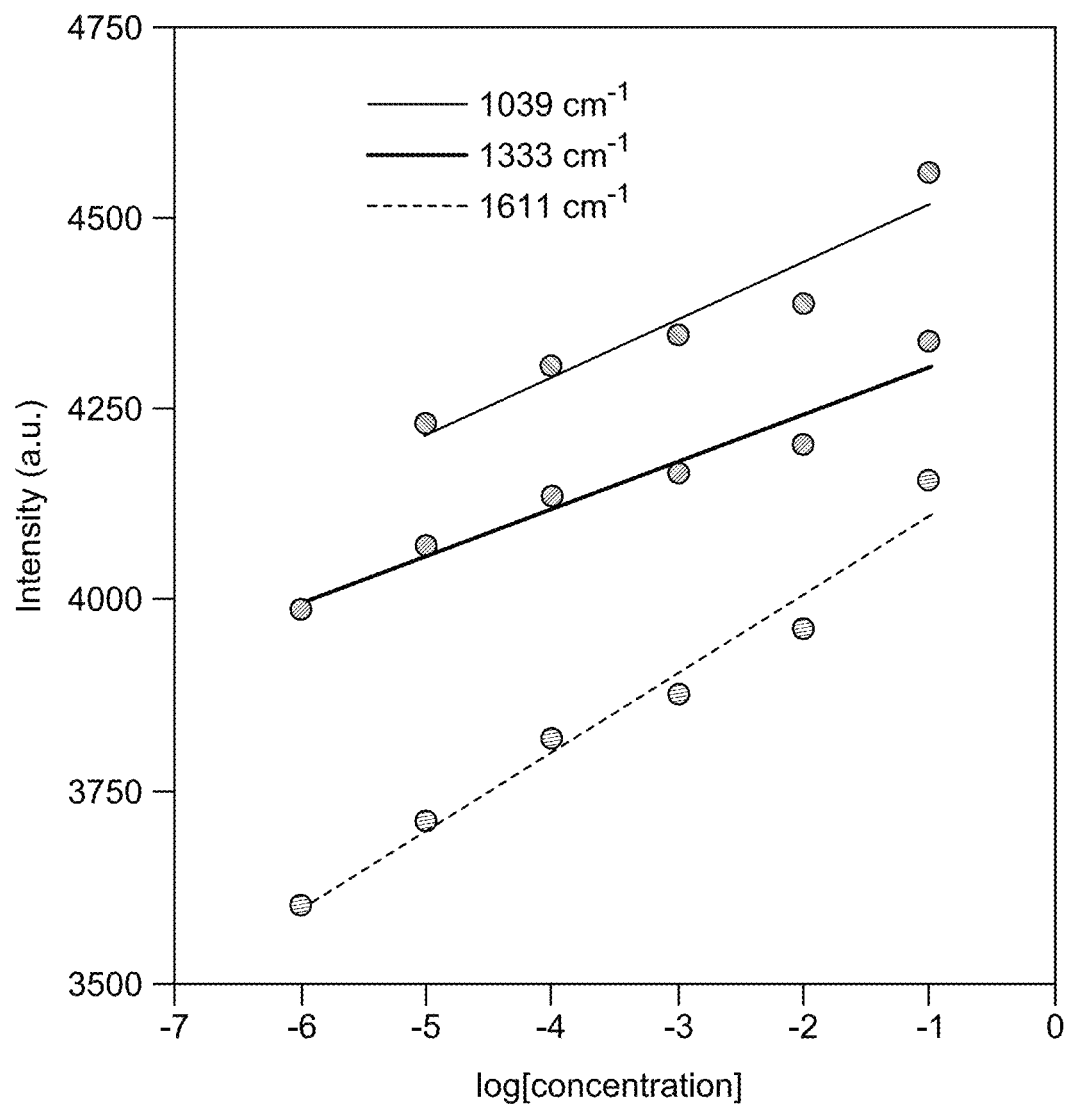
FIG. 8C is a graph depicting a linear correlation between the concentration of the DBT analyte in diesel sample with SERS intensities, according to certain embodiments of the present disclosure.

The three key SERS lines that showed the most noticeable enhancement was 1039 cm$^{-1}$ (CS stretching), 1333 cm$^{-1}$ (CH bending and CC stretching), and 1611 cm$^{-1}$ (CC ring stretching). However, the calibration using the band at 1611 cm$^{-1}$ provides better results than the other two calibration lines (FIG. 8C). It should be mentioned that there is a shift of the peak obtained in diesel media than those obtained in DMSO. The band obtained at 1602 cm$^{-1}$ in DMSO was shifted to 1611 cm$^{-1}$ in diesel media. The linear DBT concentration dependency with SERS spectral response was analyzed for three peaks in the concentration range of 0.1 M to 106 M. The LOD was 10$^{-7}$ M while the limit of quantification (LOQ) was 106 M in the diesel sample at 1611 cm$^{-1}$ was successfully achieved and corresponds to the ring stretching mode. The EF value in diesel using the Ag—SiO$_2$-Z-150 substrate was computed as EF=7.72×10$^4$ The concentration dependency responses of the key SERS peaks of the DBT in diesel were evaluated, and the corresponding LOD, linear dynamic range, and correlation coefficient (R$_2$) are listed in Table 1.

Figure 9:
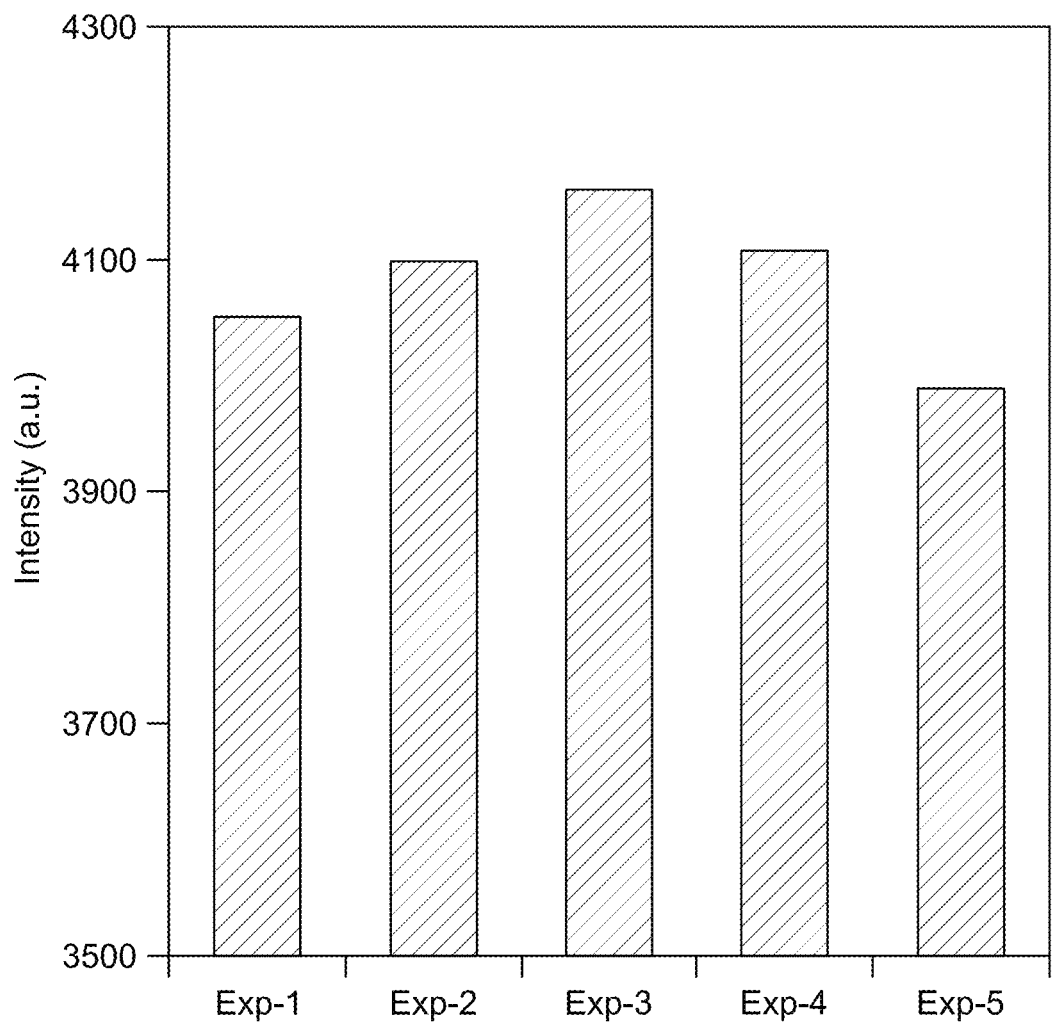
FIG. 9 is a bar graph depicting reproducibility of the SERS response in diesel with 0.1 M DBT using the $Ag-SiO_2$-Z-150 nanocomposite, according to certain embodiments of the present disclosure.
Figure 10:
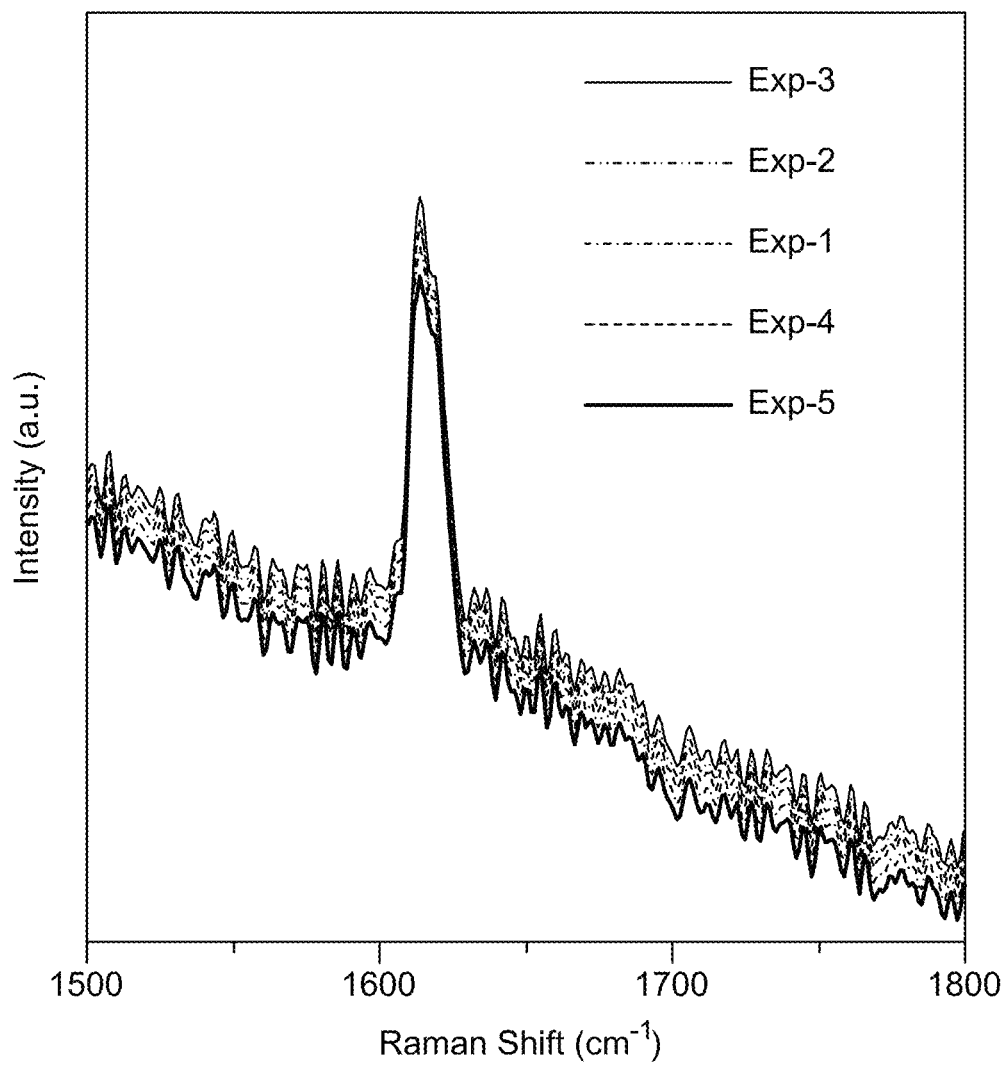
FIG. 10 is a graph depicting reproducibility of SERS responses with 0.1 M DBT spiked in the $Ag-SiO_2$-Z-150 composite, in diesel, at 1633 $cm^{-1}$ band, according to certain embodiments of the present disclosure.

The reproducibility is a key element of the SERS substrate and corresponding analytical performance. The reproducibility of the Ag—SiO$_2$-Z-150 substrate has been investigated for the 0.1 M concentration of the DBT spiked in commercial diesel (FIG. 9). The five consecutive experiments were based on the selected region from 1500 to 1800 cm$^{-1}$ where the DBT most prominent peak at 1611 cm$^{-1}$ appeared (FIG. 10). The relative standard deviation (RSD) for the parallel SERS measurements was <2% that indicates the developed SERS substrate and proposed analytical method exhibit a good reproducibility.

Example 10: Vibrational Analysis of Raman and SERS Spectra of DBT

Figure 11B:
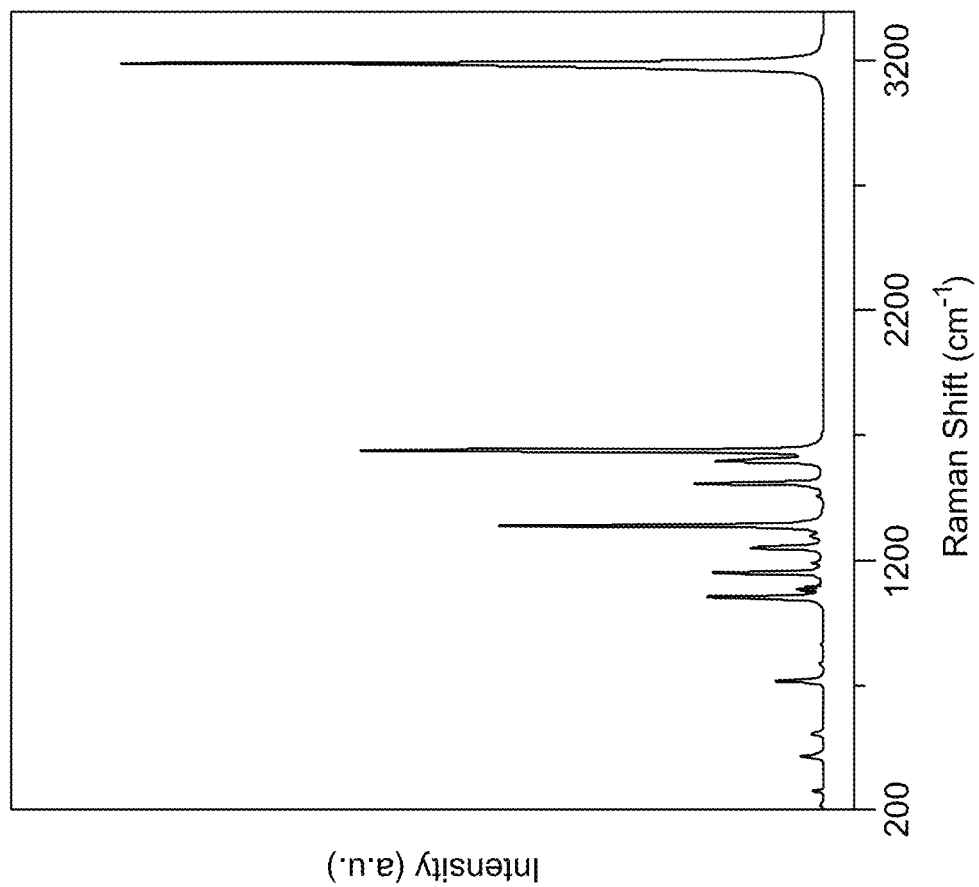
FIG. 11B is a graph depicting calculated Raman spectrum of the DBT performed at the B3LYP/6-311g (d, p) level of theory, according to certain embodiments of the present disclosure.
Figure 11A:
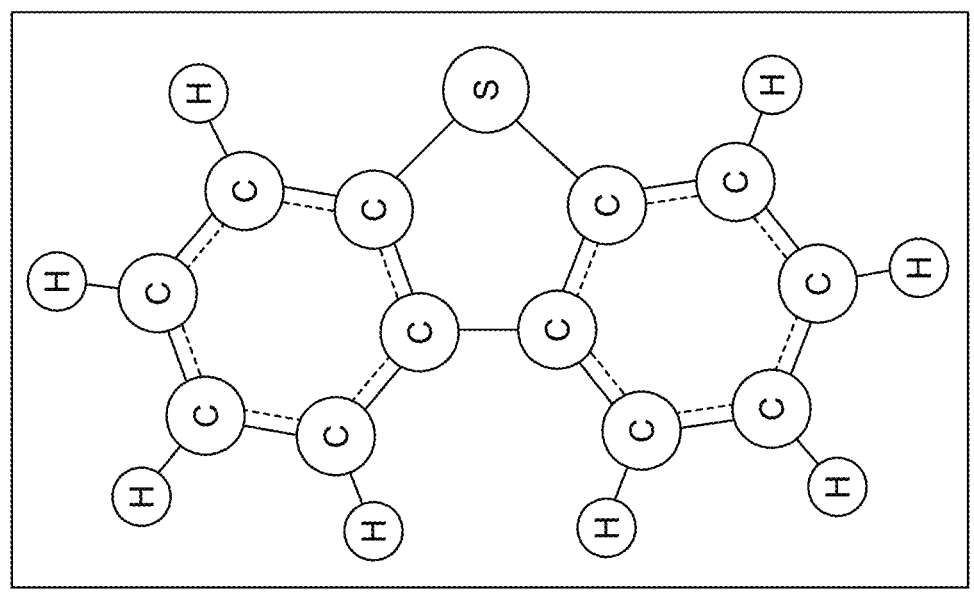
FIG. 11A is an optimized geometrical structure of the DBT, according to certain embodiments of the present disclosure.

Vibrational assignments of the Raman and SERS spectra of the DBT were carried out based on density functional theory (DFT). The DBT peaks in DMSO solvent appeared at 3060, 1599, 1557, 1477, 1317, 1233, 1130, 501, and 403 $cm^{-1}$. while three prominent bands appeared at 1615, 1330, and 1034 $cm^{-1}$ in diesel oil media in the presence of the Z-150. From DFT, the molecular structure of the DBT was optimized (FIGS. 11A-11B) using the B3LYP functional introduced by Becke and Lee et al. [A. D. Becke, Density-functional exchange-energy approximation with correct asymptotic behavior, Physical Review A. 38 (1988) 3098.; C. Lee, W. Yang, R. G. Parr, Development of the Colle-Salvetti correlation-energy formula into a functional of the electron density, Physical Review B. 37 (1988) 785, incorporated herein by reference] and the cost-effective basis set 6-311g (d,p) for moderately small organic molecules [M. Haroon, I. Abdulazeez, T. A. Saleh, A. A. Al-Saadi, SERS-based trace-level quantification of sulindac: Spectroscopic and molecular modeling evaluation, Journal of Molecular Liquids. 312 (2020) 113402, incorporated herein by reference].

Its frequency calculations were computed at the same level of theory and were scaled using a scale factor of 0.98, and the scaling technique used in the present work was developed by Baker and co-workers [J. Baker, A. A. Jarzecki, P. Pulay, Direct scaling of primitive valence force constants: An alternative approach to scaled quantum mechanical force fields, Journal of Physical Chemistry A. 102 (1998) 1412-1424, incorporated herein by reference]. The Raman bands of the DBT were predicted at 3105, 1617, 1568, 1586, 1338, 1245, 1142, 1037, 501, and 410 $cm^{-1}$ which are attributed to CH symmetric stretching, CC stretching, ring deformation, CH asymmetric stretching, CC stretching, out-of-plane CH bending, in-plane CH bending, CS stretching, ring wagging, and ring torsion, respectively, as shown in Table 3.

Notably, DFT calculations predicted several Raman peaks of the DBT in the absence of DMSO solvent. Still, experimentally some of the Raman lines associated with the DBT are suppressed in the presence of DMSO. The positions of spectral peaks of the DBT are slightly shifted in DMSO and diesel media due to bond length changes in the DBT as a result of analyte interaction with the Ag—$SiO_2$. The Raman band shift was observed in two scenarios (a) to higher wave numbers and (b) to lower wave numbers in the presence of AgSiO2. The shift of the Raman band to higher wavenumbers indicates short bond length among atoms and vice versa [C. R. Andrew, T. M. Loehr, J. Sanders-Loehr, H. Yeom, J. Selverstone Valentine, B. Göran Karlsson, N. Bonander, G. van Pouderoyen, G. W. Canters, Raman Spectroscopy as an Indicator of Cu—S Bond Length in Type 1 and Type 2 Copper Cysteinate Proteins, J Am Chem Soc. 116 (1994) 11489-11498, incorporated herein by reference; L. Popović, D. De Waal, J. C. A. Boeyens, Correlation between Raman wavenumbers and P—O bond lengths in crystalline inorganic phosphates, Journal of Raman Spectroscopy. 36 (2005) 2-11, incorporated herein by reference]. In DMSO solvent, DBT Raman bands appeared at 3060, 1599, 1557, 1477, 1317, 1233, 1130, 1024, 501, and 403 $cm^{-1}$, which were shifted in SERS to 3058, 1602, 1556, 1476, 1319, 1230, 1133, 1022, 492 and 407 $cm^{-1}$, respectively. In diesel media, Raman bands appeared at 1615, 1330, and 1034 which were shifted in the SERS spectrum to 1611, 1333, and 1039 $cm^{-1}$ respectively (Table 3).

TABLE 3

Vibrational assignment based on the literature and DFT calculation for DBT in DMSO.

| Predicted DFT ($cm^{-1}$) | Raman ($cm^{-1}$) | SERS ($cm^{-1}$) | Vibrational Assignment |
|---|---|---|---|
| 3105 | 3060 | 3058 | CH symmetric stretching |
| 1617 | 1599 | 1602 | CC stretching |
| 1568 | 1557 | 1556 | Ring deformation |
| 1586 | 1477 | 1476 | CH asymmetric stretching |
| 1338 | 1317 | 1319 | CH in-plane bending, CC stretching |
| 1245 | 1233 | 1230 | CH out-of-plane bending |
| 1142 | 1130 | 1133 | CH in-plane bending |
| 1037 | 1024 | 1022 | CS stretching |
| 501 | 501 | 492 | Ring deformation |
| 410 | 403 | 407 | Ring torsion |

Figure 12:
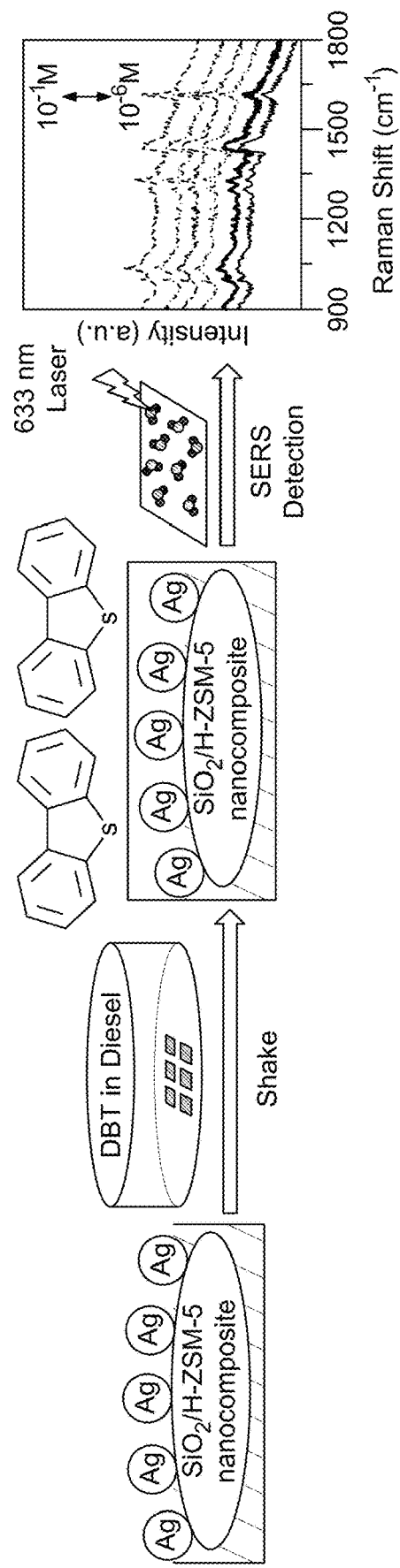
FIG. 12 is a graph depicting the method of forming the SERS substrate containing the silver-loaded silica/H-ZSM-5 nanocomposite, according to certain embodiments of the present disclosure.

The present disclosure provides the nanostructured silver-loaded silica (Ag—$SiO_2$) mixed with H-ZSM-5 (Z) materials used for the SERS-based detection of the trace DBT concentrations in diesel oil samples, as shown in FIG. 12. Among the different compositions of zeolitic materials screened, the Si/$Al_2$=150 ratio best suppresses the fluorescence background, leading to reliable monitoring of the DBT in diesel. The relationship of Raman peak intensities and amount of the DBT in diesel is established in the range from $10^{-1}$ to 106 M with LOD of $10^{-7}$ and LOQ of 106M at 1611 $cm^{-1}$. Nonetheless, the Ag—$SiO_2$ is a useful SERS substrate for detecting the DBT in the non-fluorescent DMSO environment with a LOD of as low as $10^{-9}$M. The vibrational assignments of SERS peaks of the DBT have been proposed based on the literature values and DFT computation. The present SERS-based spectroanalytical method is fast, reliable, and non-destructive. A 1:1 ratio Ag—$SiO_2$-Z-150 nanocomposite for the SERS analysis can be extended to examine other sulfur-containing compounds in oil samples.

Numerous modifications and variations of the present disclosure are possible in light of the above teachings. It is, therefore, to be understood that within the scope of the appended claims, the invention may be practiced otherwise than as specifically described herein.

The invention claimed is:

1. A surface-enhanced Raman scattering (SERS) substrate, comprising:
   a transparent substrate; and
   a nanocomposite composition comprising:
   a silver-loaded silica (Ag—$SiO_2$) nanocomposite having a silica core and a silver/silica shell disposed around the silica core; and
   a zeolitic material having a nano porous structure;
   wherein the silver/silica shell contains silver nanoparticles uniformly distributed therein;
   wherein the Ag—$SiO_2$ nanocomposite is uniformly disposed on a surface of the zeolitic material;
   wherein the nanoparticles of the Ag—$SiO_2$ nanocomposite are spherical and have a mean particle size of 100 to 500 nanometers (nm);
   wherein the silver/silica shell of the Ag—$SiO_2$ nanocomposite has a mean thickness of 50 to 350 nm; and
   wherein the SERS substrate has a specific surface area in a range of 150 to 300 $m^2/g$, a cumulative specific pore volume in a range of 0.2 to 0.3 $cm^3/g$, and an average pore diameter of 4 to 7 nm.

2. The SERS substrate of claim 1, wherein the silica core of the Ag—$SiO_2$ nanocomposite has a mean diameter of 50 to 150 nm.

3. The SERS substrate of claim 1, wherein the silver nanoparticles in the silver/silica shell of the Ag—SiO$_2$ nanocomposite have a mean particle size of 10 to 50 nm.

4. The SERS substrate of claim 1, wherein the silver nanoparticles are at least one selected from the group consisting of nanospheres, nanorods, nanostars, nanotriangles, nanoprisms, nanocubes, nanofibers, nanoplates, nanowires, nanotetrahedrons, nanocrystals, nanohexagons, nanodisks, nanoribbons, nanocylinders, nanogranules, nanowhiskers, nanoflakes, nanofoils, nanopowders, nanoholes, nanobelts, nanourchins, nanoflowers, nanoislands, and nanomeshes.

5. The SERS substrate of claim 1, wherein the Ag—SiO$_2$ nanocomposite has:
a specific surface area in a range of 10 to 100 square meter per gram (m$^2$/g);
a cumulative specific pore volume in a range of 0.1 to 0.15 cubic centimeter per gram (cm$^3$/g); and
an average pore diameter of 6 to 10 nm.

6. The SERS substrate of claim 1, wherein the Ag—SiO$_2$ nanocomposite comprises from about 5 to 25 weight percentage (wt. %) of silver.

7. The SERS substrate of claim 1, wherein a weight ratio of the silver-loaded silica nanocomposite to the zeolitic material in the nanocomposite ranges from about 1:5 to 5:1.

8. The SERS substrate of claim 1, wherein the zeolitic material has a silicon-to-aluminum molar ratio of greater than 10:1.

9. The SERS substrate of claim 1, wherein the zeolitic material has:
a specific surface area in a range of 300 to 400 m$^2$/g;
a cumulative specific pore volume in a range of 0.15 to 0.2 cm$^3$/g; and
an average pore diameter of 3 to 6 nm.

10. The SERS substrate of claim 1, has a detection limit of 1× 10-9 molar (M) for a sulfur-containing compound.

11. The SERS substrate of claim 1, wherein the transparent substrate comprises a glass substrate, and wherein the glass substrate is at least one selected from the group consisting of a fluorine doped tin oxide (FTO) coated glass substrate, a tin doped indium oxide (ITO) coated glass substrate, an aluminum doped zinc oxide (AZO) coated glass substrate, a niobium doped titanium dioxide (NTO) coated glass substrate, an indium doped cadmium oxide (ICO) coated glass substrate, an indium doped zinc oxide (IZO) coated glass substrate, a fluorine doped zinc oxide (FZO) coated glass substrate, a gallium doped zinc oxide (GZO) coated glass substrate, an antimony doped tin oxide (ATO) coated glass substrate, a phosphorus doped tin oxide (PTO) coated glass substrate, a zinc antimonate coated glass substrate, a zinc oxide coated glass substrate, a ruthenium oxide coated glass substrate, a rhenium oxide coated glass substrate, a silver oxide coated glass substrate, and a nickel oxide coated glass substrate.

12. A method of forming the SERS substrate of claim 1, the method comprising:
preparing the nanocomposite composition by:
mixing a first silica precursor compound, an alcohol, and an ammonia solution to form a silica mixture;
sonicating a second silica precursor compound with the silica mixture and mixing to form a modified silica mixture;
dropwise adding a silver salt solution to the modified silica mixture and cooling to form a crude mixture containing a silver-loaded silica nanocomposite precipitate;
separating the silver-loaded silica nanocomposite precipitate from the crude mixture and drying to form the silver-loaded silica (Ag—SiO$_2$) nanocomposite;
calcinating a zeolitic precursor compound at a temperature of at least 500° C. to form the zeolitic material; and
mixing the silver-loaded silica nanocomposite with the zeolitic material to form the nanocomposite composition;
wherein a weight ratio of the silver-loaded silica nanocomposite to the zeolitic material in the nanocomposite composition ranges from about 1:5 to 5:1.

13. The method of claim 12, wherein:
the first silica precursor compound comprises tetraethyl orthosilicate (TEOS), and tetramethyl orthosilicate (TMOS);
a volume ratio of the first silica precursor compound to the alcohol is in a range of 1:1 to 8:1; and
a volume ratio of the first silica precursor compound to the ammonia solution is in a range of 2:1 to 8:1;
wherein the alcohol has a formula (I)

wherein R$_1$ and R$_2$ are each independently selected from the group consisting of hydrogen, alkanes, alkenes, alkynes, cyclic alkanes, cyclic alkenes, cyclic alkynes and aromatics having in the range of 1 to 20 carbon atoms; and
wherein the ammonia solution has a concentration of 0.5 to 2 M.

14. The method of claim 12, wherein:
the second silica precursor compound comprises alkoxysilane compound, wherein the alkoxysilane compound is at least one selected from the group consisting of trimethoxy(octadecyl)silane, octadecyltrichlorosilane and octyldimethylchlorosilane; and
a volume ratio of the first silica precursor compound to the second silica precursor compound is in a range of 1:3 to 3:1.

15. The method of claim 12, wherein:
the silver salt is at least one salt selected from the group consisting of silver nitrate, silver sulfate, silver carbonate and silver chloride; and
the zeolitic precursor compound comprises ammonium zeolite having a silicon-to-aluminum molar ratio of greater than 10:1.

16. A method of obtaining a Raman spectrum of a sulfur-containing compound in a mixing composition, the method comprising:
contacting the mixing composition containing an analyte with the SERS substrate of claim 1 to form a sample;
exposing the sample to laser light such that a portion of the laser light is scattered by the sample to form scattered light; and
detecting the scattered light;
wherein the mixing composition comprises one or more hydrocarbons having boiling points less than 500° C.; and
wherein the sulfur-containing compound has a Raman scattering signal that is enhanced relative to that of the sulfur-containing compound in the absence of the SERS substrate.

17. The method of claim 16, wherein the sulfur-containing compound comprises thiophene, dibenzothiophene (DBT), benzothiophene, 2-methylbenzothiophene, 2,4-dimethylthiophene, 3-methylthiophene, 2-methylthiophene, and/or a mixture thereof.

18. The method of claim 16, wherein the laser light has a wavelength of 600 to 650 nm, and wherein the SERS substrate can detect the sulfur-containing compound with a detection limit of $1\times10^{-9}$ M.

* * * * *